(12) United States Patent
Busko et al.

(10) Patent No.: US 7,085,656 B2
(45) Date of Patent: Aug. 1, 2006

(54) METHOD FOR SUPPRESSING EDGE ARTIFACTS IN MAGNETIC MICROSCOPY

(75) Inventors: Claudio Felipe Busko, Cockeysville, MD (US); John Matthews, Greenbelt, MD (US); Frederick Charles Wellstood, Fairfax, VA (US)

(73) Assignee: University of Maryland, College Park, MD (US)

(*) Notice: Subject to any disclaimer, the term of this patent is extended or adjusted under 35 U.S.C. 154(b) by 2 days.

(21) Appl. No.: 11/080,396

(22) Filed: Mar. 16, 2005

(65) Prior Publication Data
US 2005/0209779 A1     Sep. 22, 2005

Related U.S. Application Data

(60) Provisional application No. 60/553,143, filed on Mar. 16, 2004.

(51) Int. Cl.
*G01B 5/28* (2006.01)
*G01L 25/00* (2006.01)
*G06K 9/00* (2006.01)

(52) U.S. Cl. .................. 702/38; 702/115; 702/191; 382/145; 324/301

(58) Field of Classification Search ............. 702/38, 702/115, 117, 191; 324/301, 313, 377; 382/145, 382/147, 312
See application file for complete search history.

(56) References Cited

U.S. PATENT DOCUMENTS 6,571,183 B1 * 5/2003 Wellstood et al. ............ 702/65

\* cited by examiner

*Primary Examiner*—John Barlow
*Assistant Examiner*—Meagan S Walling
(74) *Attorney, Agent, or Firm*—Rosenberg, Klein & Lee

(57) ABSTRACT

A technique for eliminating edge artifacts in magnetic microscopy includes the steps of scanning a SQUID over an object under study to acquire values of magnetic fields produced by currents running in the object to create a first data set having N data points. At the end of the first data set, N zero data points are added to create a second data set having 2N data points. Fast Fourier Transform (FFT) is further applied to the 2N data set to obtain k-space having $b(k)$ values. The $b(k)$ values of the k-space are averaged, and the averaged $b(k)$ values corresponding to k exceeding a predetermined k value are filtered off. A set of current density representations $i(k)$ in the k-space are obtained to which inverse FFT is applied to obtain a map of current densities $I(x,y)$ of the object. A system for performing the method of the present invention includes a software designed to suppress (or eliminate) edge artifacts present in the obtained images.

19 Claims, 30 Drawing Sheets

METHOD FOR SUPPRESSING EDGE ARTIFACTS IN MAGNETIC MICROSCOPY

REFERENCE TO RELATED APPLICATIONS

This Utility Patent Application is based on Provisional Patent Application Ser. No. 60/553,143, filed on 16 Mar. 2004.

FIELD OF THE INVENTION

The present invention relates to magnetic microscopy; and in particular, to magnetically obtaining images of electrical currents flowing in microelectronic structures for non-destructive evaluation of the structures and location of possible defects found therein.

More in particular, the present invention relates to enhancing the preciseness of locating faults in microelectronic structures by means of suppressing "edge artifacts" appearing in a magnetic field inversion process due to the finite size of real images of the object of interest.

Specifically, the present invention relates to a technique developed for eliminating "edge artifacts" by averaging neighboring points in a Fast Fourier transformed image in order to cancel out the edge function while leaving the true image data substantially unchanged.

BACKGROUND OF THE INVENTION

In the design and production of multi-layer microelectronic structures, such as semiconductor computer chips and the like, it is of great importance to map out the location of electrical short circuits in computer chips and multi-chip modules. The electrical short circuits occur when wires in the chip or in a multi-chip module are shorted to each other, to a ground plane, or to a power plane.

When a computer chip is "on", currents flow through wires in the chip. Only certain wires should be electrically connected together for a given chip to operate in a prescribed manner. However, many chips fail because of connections between wires that are not supposed to be connected. Problems may arise either on the chip, or in the module that the chip resides. If the precise location of such a fault can be accurately determined, then a manufacturer can change the design of the chip or correct the fabrication process to reduce such defects, improve the yield, and increase profits.

At present, it is difficult to precisely locate faults using conventional techniques since most chips are "flip chip" bonded onto a carrier or multi-chip module so that the circuit itself is neither visible nor accessible. A similar problem exists for the detection of short circuits in multi-chip modules wherein the modules may have many layers and may be up to a millimeter thick. The tools that the semiconductor industry would ordinarily use to find faults are practically useless in this type of system. Additionally, sophisticated techniques, such as the use of an infrared camera to detect local heating from a short in a module, yields relatively poor spatial resolution since the modules are too thick and the fact that heat diffuses over a relatively large area.

Conventional evaluation of chips is expensive in both time and resources, and often unfeasible as well as destructive. One method for non-destructive evaluation of the problems occurring in semiconductor chips or modules is running current through the chip and then imaging the magnetic field produced at the surface.

The magnetic field image can then be inverted by a well-known algorithm into a current density map, which subsequently can be compared to CAD diagrams of the chip wiring around the problem area and the location of the problem may be determined. Scanning SQUID (Superconducting Quantum Interference Device) microscopes can acquire such magnetic images and can be successfully used for applications in the semiconductor circuit diagnostics. The main advantage that the SQUID microscope has over all other imaging schemes is that the chips, even metallic conducting regions thereof, are completely transparent to magnetic fields.

The SQUID microscopes however possess an even more important advantage over other fault detection techniques wherein they can resolve fine details at a distance. This is important since the current carrying portions of a chip or multi-chip module are hidden on the backside of a flip chip wafer and are thus distanced from the detection microscope by 100–200 micrometers. To resolve details that are much smaller than this stand-off is exponentially difficult. However, by using Maxwell's Equations, the physical laws that govern the behavior of electric and magnetic fields, the magnetic field images acquired by the SQUID can be converted into direct images of the current flowing in the chip. The process of converting a magnetic field image into a picture of the source currents that created the field is called a "magnetic inversion".

Any image acquired with the SQUID system is of a finite size. Beyond the edges of the image, no information about the magnetic field is acquired. When such finite size images are converted into current images by the magnetic inversion process, the edges of the image cause artifacts (noise or interference) which can obscure the wires and also prevent achieving a finer spatial resolution. Such artifacts arise since the field effectively appears to drop to zero at the edge of the image, which in fact is not the case.

Manhattan Filters (the technique developed at the University of Maryland by the Applicant of the present patent application) have been used to reduce these edge artifacts. The Manhattan Filter technique involves the manual removal of regions of the transformed image which contain the edge artifact information. In some cases this is an effective method for removing the edge artifacts. However, such a technique fails to be effective when the main features in the image are aligned with the edges of the image. An additional drawback of the Manhattan Filtering technique is that it requires an expert to recognize which regions of the transformed image should be removed.

Most methods for removing edge artifacts in images involve smoothing the border of the original image since it has the sharp edge which generates the artifacts. However, this is a generally unsatisfactory solution as it involves modifying, or even losing, valuable data. The primary concern of magnetic microscopy is obtaining the finest spatial resolution possible in the final current density image and eliminating edge effects that arise due to finite image size. It is thus highly desirable to develop a technique which effectively eliminates edge artifacts and which can be easily automated and incorporated into existing magnetic inversion software.

SUMMARY OF THE INVENTION

It is therefore an object of the present invention to provide a technique for efficiently suppressing edge artifacts appearing as the result of the magnetic inversion process in the magnetic microscopy due to the finite image size. This technique may be used in many applications of magnetic imaging and does not cause the corruption of valuable data obtained during data acquisition process.

It is a further object of the present invention to provide a technique for suppressing the edge artifacts in magnetic microscopy in order to attain the fine spatial resolution of the final current density image free of edge noise.

In the method for suppressing edge effects in magnetic microscopy of the present invention, a SQUID is scanned over an object which may be a chip or a multi-chip module. Values of magnetic fields produced by currents running in the chip (or multi-chip module) are sensed by the SQUID and are recorded into the memory of a computer to create a first data set having N data points (the number of steps where the measurements of the magnetic fields has been made). Upon the first set of the measured magnetic fields having been created, the processor adds N data points at the end of the first data set thus creating a second data set having 2N data points. In the second data set, all N data added to the first data set have a zero value. A Fast Fourier Transform (FFT) is run on the second data set having 2N data points to obtain a k-space having b(k) values, each corresponding to a respective data point in the second data set.

The next step in the process is the averaging of the b(k) values of the k-space and filtering the averaged b(k) values corresponding to k which exceeds a predetermined $k_w$ value (the $k_w$ is a k-space filter cut off value).

A set of current density representations is obtained in the k-space by dividing the averaged b(k) values by Green's Function which is representative of geometrical factors. Finally, the inverse Fast Fourier Transform (FFT) is applied to the set of the current density representation in the k-space to obtain a map of current densities I in real domain of the object of interest.

Two techniques are used for averaging b(k) values in the k-space. According to the first technique, the averaged b(k) is calculated as $$b(k_n) = \frac{b(k_n) + b(k_{n+1})}{2}$$

along each direction in the k-space wherein $k_n$ and $k_{n+1}$ are neighboring points in the k-space. Alternatively, the averaged b(k) is calculated as $$b(k_n) = \frac{b(k_{n-1}) + 2b(k_n) + b(k_{n+1})}{4}$$

along each direction of the k-space, wherein $k_{n-1}$, $k_n$ and $k_{n+1}$ are neighboring points taken in sequence in the k-space.

The spatial resolution in the final current density image and effectivity of eliminating edge effects arising due to finite image size are related to the k-space filter cut-off value $k_w$. In the technique of the present invention, $k_w$ is increased beyond that which can otherwise be achieved. The characteristics of the magnetic microscopy technique are improved by increasing the number of data points within the boundaries of the image size.

The technique of the present invention for suppressing edge effects unwantedly appearing due to the finite image size is applicable to both a one-dimensional measurement and a multi-dimensional measurement. For example, in a two-dimensional measurement, a two-dimensional first data set is created, where data is taken both for X and Y directions. This two-dimensional first data set is divided into four quadrants, including Northeast, Southwest, Southeast, and Northeast quadrants. These quadrants are shuffled in a predetermined order by exchanging the positions of the Northeast and Southwest quadrants, as well as exchanging the position of Northwest and Southeast quadrants, thus creating a shuffled two-dimensional data set to which the Fast Fourier Transform is applied to obtain a two-dimensional k-space. Subsequently, the b(k) values of the two-dimensional k-space are averaged, and the averaged b(k) values are converted into representations of current density in the k-space. The representations of the current density are filtered out by omitting those current densities I(k) corresponding to k values exceeding the $k_w$. The inverse FFT is then applied to the set of the representations of current densities in the k-space to obtain a shuffled two-dimensional set of current densities in real domain, and finally the shuffled current densities set is unshuffled to obtain a map of the current densities I(x, y).

These and other features and advantages of the present invention will be fully understood and appreciated from the following detailed description of the accompanying Drawings.

DETAILED DESCRIPTION OF THE PREFERRED EMBODIMENTS

Figure 1:
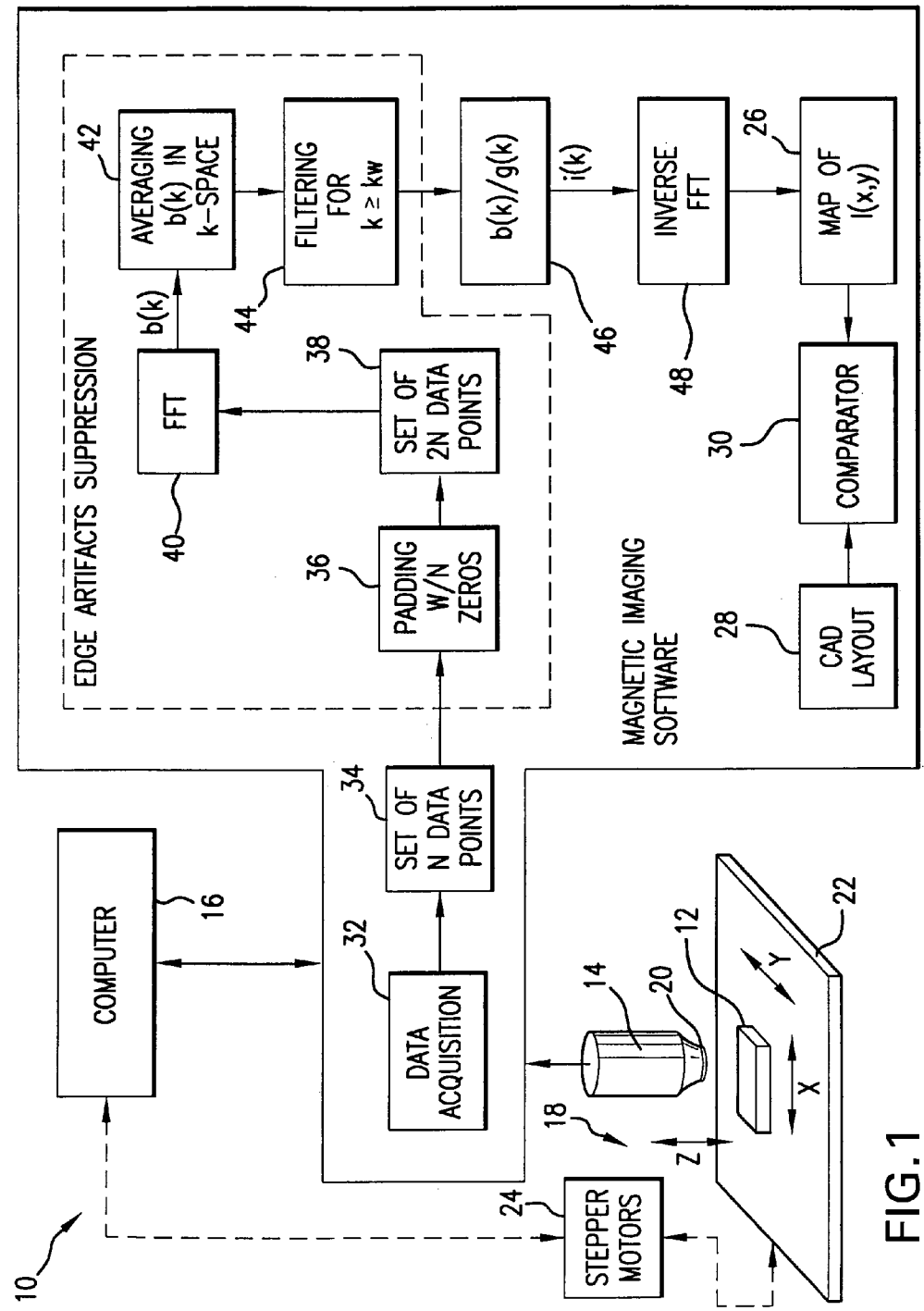
FIG. 1 is a schematic representation of the magnetic microscopy system of the present invention.

Referring to FIG. 1, there is shown a system 10 for obtaining a map of current density distribution in a sample 12 under study. A SQUID microscope 14 is used for acquisition of magnetic fields on or over the surface of the sample 12 generated by current within the sample 12. A computer 16 is employed for processing data acquired by means of the SQUID microscope 14, and further controls the positioning means 18 which changes the relative disposition between the sample 12 and the SQUID microscope 14.

The scanning SQUID microscope 14 includes a sensitive detector 20 of the magnetic fields which is a DC Superconducting Quantum Interference Device (SQUID). The SQUID microscope 14 uses the SQUID detector 20 which is formed from a high transition temperature superconductor $YBa_2Cu_3O_7$. The SQUID detector is cooled to 77K using a commercial cryo-cooler. In order to obtain images with a satisfactory spatial resolution, the SQUID detector 20 is brought to the sample as close as possible, in order to maintain the separation between the sample 12 (disposed in the ambient atmosphere) and the SQUID detector 20 (placed in the cryogenic environment) below a predetermined value. The SQUID is scanned over the surface of the sample 12 to acquire a low noise image of the magnetic fields on and above the surface of the sample 12.

The sample 12 may be a microelectronic structure such as, for example, a semiconductor computer chip, a multi-chip module, etc.

The distance between the SQUID and the surface of the sample is as minimal as possible for measurements. Due to the thickness of the silicon die of the sample 12 and the use of the flip-chip bonding, usually used in microelectronics, the separation between the SQUID detector 20 and the sample 12 is in the range not exceeding 100–200 μm. The image sizes taken by the SQUID microscope may vary from 1 mm to 10 cm. Magnetic fields emanating from the sample 12 are picked up by the SQUID detector 20 as it moves relative to the sample 12 by means of the positioning system 18 which includes a scanning stage 22 and stepper motors 24.

The motors 24 are controlled by the computer 16 to change the relative disposition between the sample 12 and the SQUID detector 20 in X, Y, and Z directions. The output signal of the SQUID is recorded by the computer 16, which also keeps track of the position of the sample 12. The acquired data is displayed on the screen of the computer 16 as an image of magnetic fields on and above the sample 12. The computer 16 processes the acquired data to generate a map 26 of the current densities in the sample 12. The map (or the image) 26 of the current flowing in the wires of the sample 12 is further compared in block 30 to the CAD layout of block 28 used to create the chip (or the module) 12 in order to locate a faulty region which may occur in the sample 12.

The computer 16 processes the acquired data in accordance with the novel data processing algorithm of the present invention which is particularly developed for suppression of the edge artifacts appearing as a result of the finite image size taken by the SQUID microscope 14, as will be explained infra.

Any image of the magnetic field acquired by the SQUID microscope 14 is of a finite size. Beyond the edges of the image, there is no information about the magnetic field. When the finite size images of the magnetic field are converted into current images, the presence of the edges causes the artifacts (a.k.a. noise or interference) which may obscure the wires and prevent a finer spatial resolution being acquired. These artifacts arise due to the fact that the field effectively appears to drop to zero at the edge of the image taken by the SQUID. The data analysis in accordance with the present invention, which will be discussed in detail infra in the present Patent Application, provides for efficient suppression of the edge artifacts and thus prevents an increase in the quality of the resulting images of the currents in the sample 12.

To understand why edge artifacts appear in the process, the standard magnetic inverse has been examined and analyzed in the Publication titled "Relationship Between Spatial Resolution and Noise in SQUID Microscopy" by S. Chatraphorn, E. F. Fleet, and F. C. Wellstood. In general, it is not possible to convert a magnetic field image into a unique current density image. However, if the magnetic field is generated by currents that are confined to a very thin sheet of thickness d that is located at a distance z from the SQUID, and d is much smaller than z, e.g., d<<z, then it is possible to uniquely determine the location and strength of the source currents from the generated magnetic field.

In accordance with the Biot-Savart law, the normal component of magnetic field $B_z$ at position (x, y, z) can be presented as:

$$B_z \approx \frac{\mu_0 d}{4\pi} \int_{-\infty}^{\infty}\int \frac{(y-y')J_x - (x-x')J_y}{[(x-x')^2 + (y-y')^2 + z^2]^{3/2}} dx' dy' \qquad \text{(Eq. 1)}$$

where $\mu_0 = 4\pi \times 10^{-7}$ T·m/A is the permeability of free space, and $J_x(x',y')$ and $J_y(x',y')$ are the x and y components of the current-density, respectively. Eq. 1 is a convolution of current density $J_x$ or $J_y$ with geometrical factors that constitute Green's functions. Taking a Fourier transform and using the convolution theorem allows Eq. 1 to be written in Fourier space as:

$$b_z(k_x, k_y) = \frac{i_k \mu_0 d}{2} \frac{e^{-kz}}{k} [k_y j_x - k_x j_y] \quad \text{(Eq. 2)}$$

where $b_z(k_x,k_y,z)$, $j_x(k_x,k_y)$ and $j_y(k_x,k_y)$ are the two-dimensional Fourier transforms of the z component of the magnetic field and the x and y components of current density, respectively while $k_x$ and $k_y$ are the components of the spatial frequency $\vec{k}$, and $k=\sqrt{k_x^2+k_y^2}$.

The function $b_z(k_x,k_y,z)$ is found by taking a Fourier transform of magnetic field data, while $j_x$ and $j_y$ are unknown current densities. With just Eq. 2 available, it is not possible to find $j_x$ and $j_y$. One component though can be eliminated by assuming that current density is conserved, i.e., $\vec{\nabla} \cdot \vec{J} = 0$. In the Fourier space this becomes $$-ik_x j_x - ik_y j_y = 0 \quad \text{(Eq. 3)}$$

From Eqs. 2 and 3 it is found that:

$$j_x(k_x, k_y) = -\frac{2i}{\mu_0 d} e^{kz} \frac{k_y}{k} b_z(k_x, k_y, z) \quad \text{(Eq. 4)}$$

$$j_y(k_x, k_y) = \frac{-2i}{\mu_0 d} e^{kz} \frac{k_x}{k} b_z(k_x, k_y, z) \quad \text{(Eq. 5)}$$

The current density in real space can now be obtained by taking an inverse Fourier transform of Eqs. 4 and 5. It is noted that Eqs. 4 and 5 contain an exponential factor that diverges as k increases. This factor exactly compensates for the attenuation of high spatial frequencies in $b_z$ as distance z increases, enabling a sharpening of the current density image.

However, in practice, the integration must be cut off when taking the inverse Fourier transform since measured magnetic field data contains both discontinuities at its edges as well as noise which extends to high spatial frequencies and will cause the integration to diverge. To cut off the integration, the right hand side of Eqs. 4 and 5 is multiplied by a filter which terminates the integration at a maximum spatial frequency $k_w$. The choice of $k_w$ will depend both on the noise level and the region where the edge effects begin to appear.

The primary concerns of the magnetic microscopy are to obtain the finest spatial resolution s possible in the final current-density image and to eliminate edge effects that arise due to finite image size. Both the spatial resolution and edge effects relate to $k_w$, the k-space filter cutoff value, as will be presented infra herein.

Spatial Resolution

A basic result of applying a Fourier inverse-transformation from $f(k) \rightarrow F(x)$, as described supra, is that the pixel (step) size in the real space image is related to the largest k in the k-space image by $$\Delta x = \frac{2\pi}{k_{\max}}.$$

Of greater importance is that the spatial resolution of the image also obeys the relationship:

$$s = \frac{c}{k_w} \quad \text{(Eq. 6)}$$

where the constant c varies depending on the filtering method used in k-space. The basic result given by Eq. 6 can be understood as equivalent to the well known uncertainty principle $$\Delta x \Delta p \geq \frac{\hbar}{2} \Rightarrow \Delta x \geq \frac{1}{2\Delta k} \quad \text{(Eq. 7)}$$

For a flat hard cutoff filter it has been found that c~2.78. Other filters typically yield c of the same magnitude.

Edge Effects Due to Finite Image Size

From an abstract mathematical point of view, an ideal magnetic field image would be infinitely large, or at least large enough so that the magnetic field is effectively zero (disregarding noise) at all its edges. Practically speaking, however, this is extremely difficult to accomplish and generally undesirable since it means time is wasted taking data where the field is negligible. Thus, real images are often of a "small" size and can have a sudden discontinuity at the edges where there is no further measurement of the B-field.

The sudden discontinuity leads to high-k components in Fourier space. Additionally, the next step in the processing data, as will be presented infra herein, is dividing representations of magnetic fields in k-space by the Green's function g(k) which causes an exponential increase in the high-k amplitude (Eqs. 4 and 5). These phenomenas are not a side-effect of improper inversion mathematics but result from the algorithm's transformation of the edge. The inversion is thus reporting the correct current-density image for the measured magnetic field (up to k-space cut-offs). However, the edge currents (located in the vicinity of the inverted image's edges) are not real, but represent an undesired artifact of the finite image size.

Figure 2:
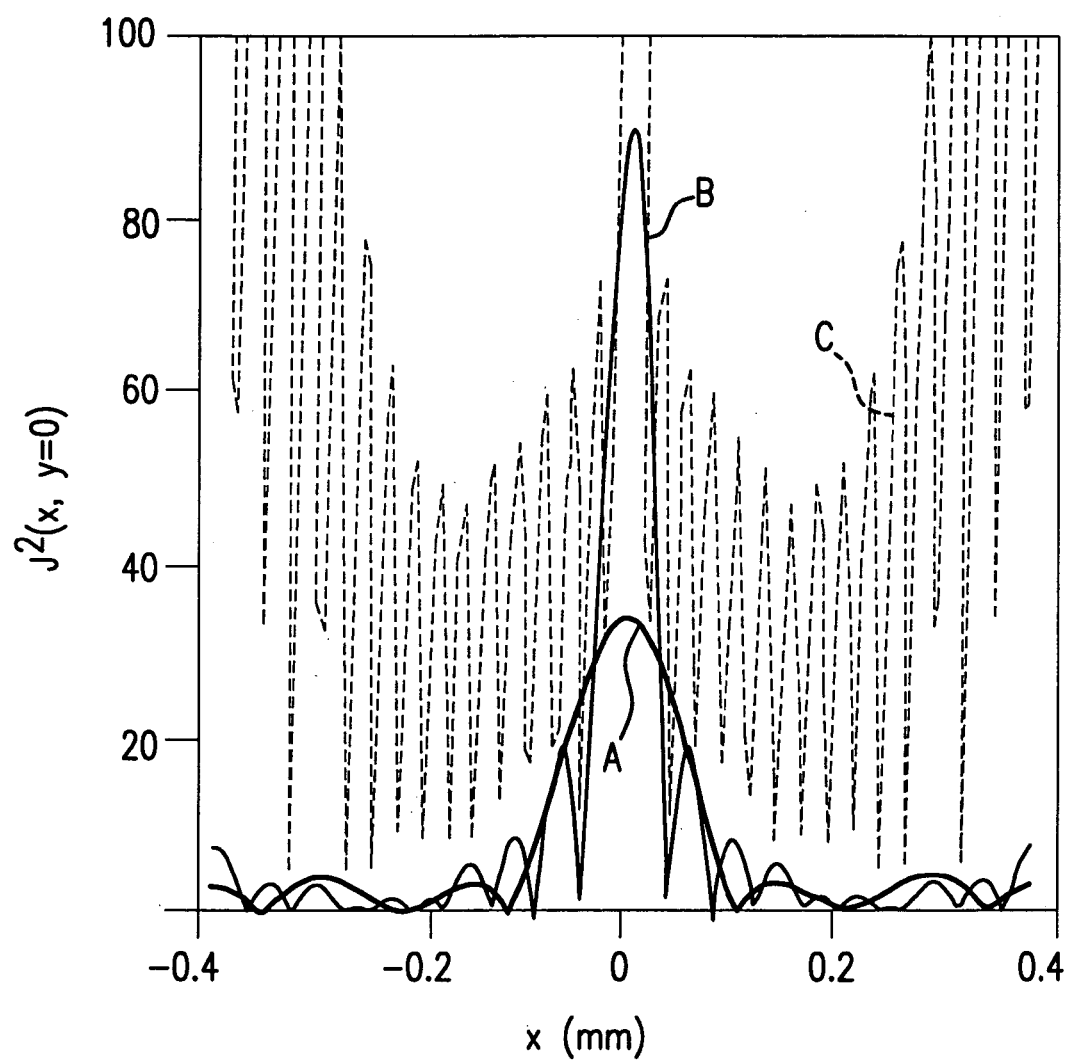
FIG. 2 is a diagram of current density vs. x showing the edge artifacts appearing in the magnetic inversion process.

FIG. 2 illustrates an example of the edge artifacts. Current density $J^2$ is plotted vs. x for different inversions of a simulated long straight wire for which $$B_x(x) = \frac{1}{x^2 + z_0^2} \quad \text{(Eq. 8)}$$

The number of data points measured N=160×160, and the measurement step dx=5 μm. The first inversion uses a relatively small $2k_w z_0$=6.28 (line A). As predicted, it has the worst spatial resolution. The second inversion uses $2k_w z_0$=15.7 (line B). Its spatial resolution is better, however the edge effects are slightly more pronounced. The third inversion uses $2k_w z_0$=23.6 (line C). In this inversion, $k_w$ has become too large and the edge effects severely compromise the current image.

Each inverse has been carried out for $z_0=100$ μm and for several different values for $k_w$. As noted above, as $k_w$ increases the spatial resolution becomes better. This can be seen qualitatively in FIG. 2 from the FWHM (Full-Width Half-Maximum) of the central peak. Thus, for $2k_w z_0=15.7$, it was found that s~60 μm. On the other hand, the $2k_w z_0=15.7$ inversion shows a large "signal" at the very edge of the plot which is in fact an edge artifact. Increasing to $2k_w z_0=23.6$ reveals that the edge effects dominate the image.

From results such as shown in FIG. 2, circumstances can be identified where the Fourier transform of an image with discontinuous edges begins to diverge from the transform of the same image that is not bounded by edges. In FIG. 2, the two smallest $k_w$ inversions (lines A and B) do not go beyond this limit, which is defined as $k_w \leq k_{edge}$; while the $2k_w z_0=23.6$ image does (line C), which is identified as $k_w \geq k_{edge}$.

Figure 3:
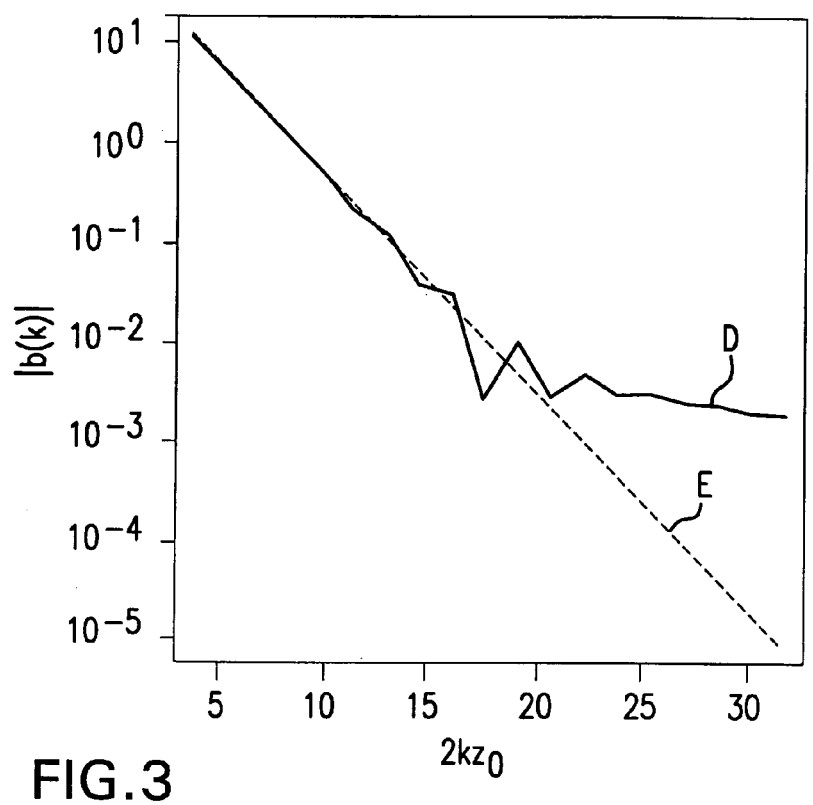
FIG. 3 is a diagram of the absolute value of b(k) vs. $2kz_0$ for the magnetic field generated by electrical current flowing along a long straight wire with the diagram showing the theoretical result for an image with no edge effects (dashed line) and the FFT of simulated data (solid line)

To determine $k_{edge}$ systematically, the Fourier space version of FIG. 2 is shown in FIG. 3, which is a graph of $|b_x(k)|$ vs. $2kz_0$ for the transform of the magnetic field from a long straight wire.

The dashed curve E of the FIG. 3 shows the theoretical result $$b_x(k) = \frac{\pi}{2z_0} e^{-|k|z_0}$$

for the Fourier transform when there is no edge; and the solid curve D shows the discrete transform of the same field that has been cut to an L=0.08 m image. At around $2kz_0 \sim 17$ the transform of the finite image begins to diverge from that of the unbounded image. From this $2k_{edge}z_0=17$ is defined. In this case, finding $k_{edge}$ for the magnetic field is not difficult since a simple functional form for the unbounded image is available which can then be compared to the transform from images of different sizes. The general problem for an arbitrary source has not been solved.

Edge-function Analysis

In order to understand the nature of these artifacts the effects of edges on a Fourier transform may be analyzed. For the sake of simplicity, a one-dimensional transform is considered. Since, in principle, higher-dimensional transforms can be built out of successive applications of 1-D transforms, the one-dimensional transform is sufficient to understand the effect of an edge.

The 1-D Fourier transform of a function $B(x,z, \ldots)$, is defined by $$b(k) = \int_{-\infty}^{\infty} e^{ikx} B(x, z, \ldots) dx \quad \text{(Eq. 9)}$$

However, for an image of size 2L, a version is evaluated where the integral limits are $-L<x<L$. To proceed, the above integral is decomposed into separate parts:

$$b(k) = \int_{-L}^{L} e^{ikx} B(x, z, \ldots) dx + \int_{L}^{\infty} e^{ikx} B(x, z, \ldots) dx + \int_{-\infty}^{-L} e^{ikx} B(x, z, \ldots) dx \quad \text{(Eq. 10)}$$

The first term in Eq. 10 is the only one which may be computed for a real data set. The remaining terms are defined as the Edge function. Considering the first term, $$\varepsilon^+(x) = \int_{L}^{\infty} e^{ikx} B(x) dx \quad \text{(Eq. 11)}$$

Integrating by parts using $\int uv' = uv - \int vu'$ where $u=B(x)$ and $v'=e^{ikx}$, there is obtained:

$$\varepsilon^+(k, z, \ldots; L) = \frac{e^{ikx}}{ik} B(x) \Big|_{L}^{\infty} - \frac{1}{ik} \int_{L}^{\infty} e^{ikx} \frac{\partial B}{\partial x} dx \quad \text{(Eq. 12)}$$

Continuing to integrate by parts, this can be extended to yield an infinite series:

$$\varepsilon^+(k, z, \ldots; L) = \frac{e^{ikx}}{ik} B(x) \Big|_{L}^{\infty} - \frac{e^{ikx}}{(ik)^2} \frac{\partial B}{\partial x} \Big|_{L}^{\infty} + \frac{e^{ikx}}{(ik)^3} \frac{\partial^2 B}{\partial y^2} \Big|_{L}^{\infty} - \ldots \quad \text{(Eq. 13)}$$

This series is known as an asymptotic series, and does not necessarily converge. However, for large enough kL, the first few terms generally yield a good approximation to the true edge function.

If it is assumed that all derivatives of B with respect to x vanish at infinity, then the series can be expressed concisely as:

$$\varepsilon^+(k, z, \ldots; L) = -\sum_{n=0}^{\infty} \left(\frac{i}{k}\right)^{n+1} e^{ikx} \frac{\partial^n B}{\partial x^n} \Big|_{L}$$

$$= e^{ikL} \sum_{n=0}^{\infty} \left(\frac{i}{k}\right)^{n+1} \frac{\partial^n B(x, z, \ldots)}{\partial x^n} \Big|_{x=L} \quad \text{(Eq. 14)}$$

The second piece of the edge function that corresponds to $-\infty < x < -L$, is included and the Edge function can be presented as:

$$\text{Edge}(k, z, \ldots; L) = \quad \text{(Eq. 15)}$$

$$e^{ikL} \sum_{n=0}^{\infty} \left(\frac{i}{k}\right)^{n+1} \frac{\partial^n B}{\partial x^n} \Big|_{x=L} - e^{-ikL} \sum_{n=0}^{\infty} \left(\frac{i}{k}\right)^{n+1} \frac{\partial^n B}{\partial x^n} \Big|_{x=-L}$$

The real part of the edge function, which would be the only non-zero component for a symmetric B(x) is:

$$\text{Re}[\text{Edge}(k, z, \ldots; L)] = \quad \text{(Eq. 16)}$$

$$\frac{-\sin kL}{k}(B(L) + B(-L)) - \frac{\cos kL}{k^2}\left(\frac{\partial B}{\partial x}\right)_{x=-L}^{x=L}$$

The imaginary part, which would dominate if B(x) is asymmetric and is:

$$\text{Im}[\text{Edge}(k, z, \ldots; L)] = \qquad (\text{Eq. 17})$$

$$\frac{\cos kL}{k}(B\mid_{x=-L}^{x=L}) - \frac{2\sin kL}{k^2}\left(\frac{\partial B}{\partial x}\bigg|_{x=L} + \frac{\partial B}{\partial x}\bigg|_{x=-L}\right)$$

Ordinarily, this transform is evaluated with N points. Suppose however the transform is evaluated with 2N points for an image of size 2L. The effect of using such a discrete Fourier transform may now be considered. The important point to realize is that the discrete FFT only yields results at specific discrete values of k. For a transform with 2N points and an image size of 2L+dx these turn out to be the values of k which satisfy $$k_j = \frac{\pi}{L}\left(\frac{N-1}{N}\right)(j-1) \cong \frac{\pi}{L}(j-1) \qquad (\text{Eq. 18})$$

where $0 \le j \le 2N-1$

If we evaluate the Edge function at these specific values of k the real part becomes:

$$\text{Re}[\text{Edge}(m, z, \ldots; L)] \cong -(-1)^m \frac{L^2}{(2m\pi)^2} \frac{\partial B}{\partial x}\bigg|_{x=-L}^{x=L} \qquad (\text{Eq. 19})$$

$$= -(-1)^m \frac{1}{k^2} \frac{\partial B}{\partial x}\bigg|_{x=-L}^{x=L}$$

Likewise, the imaginary part becomes:

$$\text{Im}[\text{Edge}(m, z, \ldots; L)] \cong (-1)^m \frac{L}{(2m\pi)} B\bigg|_{x=-L}^{x=L} \qquad (\text{Eq. 20})$$

$$= (-1)^m \frac{1}{k} B\bigg|_{x=-L}^{x=L}$$

At these discrete values of k, the Edge function Edge(m, z, . . . ,L) simplifies significantly. It depends only on the value of B or its derivative at the endpoints, and decays as a simple inverse power with k. Even more important is the $(-1)^m$ oscillation, i.e., the function changes sign with neighboring data points. This will turn out to be the important property of the edge function that will be used in the present invention to suppress the edge effects in the magnetic inverse.

To see how this works, consider averaging neighboring data points in k-space:

$$b(k_n) = \frac{b(k_n) + b(k_{n-1})}{2} \qquad (\text{Eq. 21})$$

For b(k) that vary slowly in k-space, this should produce very little effect. On the other hand, the Edge function will be almost canceled out, due to the alternating sign. After performing this or π–2π averaging on the Edge function, the remaining function (real part and imaginary part) is:

$$\langle \pi - 2\pi\ \text{Re}[\text{Edge}]\rangle \approx -\frac{L^2\pi}{(2m\pi)^3}\left(\frac{\partial B}{\partial x}\right)_{x=-L}^{x=L} \qquad (\text{Eq. 22})$$

$$= -\frac{\pi}{k^3 L}\left(\frac{\partial B}{\partial x}\right)_{x=-L}^{x=L}$$

$$\langle \pi - 2\pi\ \text{Im}[\text{Edge}]\rangle \approx -\frac{L\pi}{2(2m\pi)^2} B\bigg|_{x=-L}^{x=L} \qquad (\text{Eq. 23})$$

$$= -\frac{\pi}{2k^2 L} B\bigg|_{x=-L}^{x=L}$$

It is noted that the highest order term in 1/k has been canceled in each case, so that after such a k-space averaging the edge artifact is reduced.

The π–2π Averaging Procedure

The "π–2π-averaging-technique" of the present invention uses the properties of the Edge function of the Fast-Fourier-Transform (FFT) described supra herein to reduce edge effects appearing due to a finite picture size.

The basic idea is to form a data set with N points and then to "pad" the end of the data set with zeros until the number of points is doubled, i.e., forming a set of 2N points. This effectively halves the "dk" step reported by the FFT algorithm. The padded FFT will then have twice as many points as the unpadded FFT but contains basically the same transform of the data.

Figure 4:
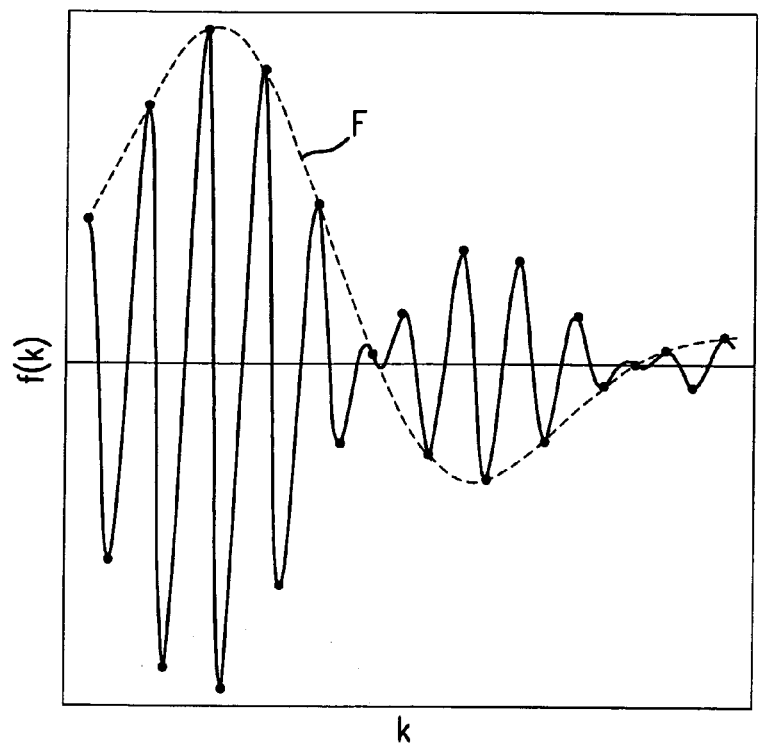
FIG. 4 is a diagram presenting the output of both a standard FFT and one that has been "padded" with N zeros at the end, in accordance with the principles of the present invention.

FIG. 4 shows the difference between the output of the standard FFT and one that has been padded with N zeros at the end in accordance with the present invention. Both FFT's sample the same periodic function (dashed curve F) to pick out values of the dummy function. The difference is that the standard FFT uses values at every full period of the periodic function (where the function touches the envelope), whereas the π–2π-FFT uses values at every half period of the oscillatory function (every dot), as presented in FIG. 4.

The discrete nature of the FFT algorithm prescribes that it calculates the Fourier transform of the data only at exact, discrete values of k. An FFT transform $f_n$ of data $d_{pn}$ can be defined by the following equation:

$$f_n = \sum_{p=1}^{N} d_p e^{i\left(\frac{2\pi}{N}\right)(p-1)(n-1)} \text{ with } n \in \{1, 2, \ldots N\} \qquad (\text{Eq. 24})$$

and can be shown to output data ($f_n$) only and exactly at values $$k_n = \frac{2\pi}{L}\left(\frac{N-1}{N}\right)(n-1).$$

The fourth row of Table 1 presented infra herein illustrates that the $k_n$ used in the padded FFT are a combination of the $k_n$ used in the standard FFT (the "2π" values) and values that lie in between the standard values (the "π" values). This property of the padded data is the reason why the scheme for suppressing the edge function is called the "π–2π-technique".

TABLE 1

| Item | Original Data | Padded Data |
|---|---|---|
| Number of Points | N | N' = 2N |
| Length | L | $L' = 2L + \frac{L}{N-1} = \frac{(2N-1)L}{N-1}$ |
| dx | $\frac{L}{N-1}$ | $dx' = \frac{L'}{N'-1} = \frac{L}{2N-1}\left(\frac{2N-1}{N-1}\right)$ $= \frac{L}{N-1} = dx$ |
| Data output at $k_n$ | $k_n = \frac{2\pi}{L}\left(\frac{N-1}{N}\right)(n-1)$ | $k_n = \frac{\pi}{L}\left(\frac{N-1}{N}\right)(n-1)$ |
| $k_{max}$ used | $k_N = \frac{2\pi}{L}\left(\frac{N-1}{N}\right)(N-1) = \frac{2\pi}{L}\frac{(N-1)^2}{N}$ | $k_N = \frac{\pi}{L}\frac{(N-1)}{N}(2N-1)$ |

The result of the padded FFT contains twice as many points (2N) as the standard result (N). Moreover, the π–2π-FFT points oscillate between positive and negative signs for large k if the data abruptly ends at the edge of an image. As has been disclosed supra, this suggests that the π and 2π values can be averaged in order to suppress the oscillations in k-space which appear due to the edge effects. With this approach, the π–2π-averaged transform will be closer to what would be the transform of the data if there were no edge to the image.

The One-dimensional π–2π Inversion

For the sake of understanding the procedure, a specific example of the method of the present invention is now discussed. The simplest situation, a long straight wire is considered for this example, however, it has to be understood by those skilled in the art that the method of the present invention is applicable in many other configurations which are also included in the scope of the present invention. The x-component of the field has the form:

$$B_x(x) = \frac{1}{x^2 + z_0^2} \qquad \text{(Eq. 25)}$$

where $z_0$ is the separation between the SQUID and the sample. If the image was infinitely large, this function has the Fourier transform:

$$b_x(k) = \frac{\pi e^{-|k|z_0}}{z_0} \qquad \text{(Eq. 26)}$$

thus it is simple to verify how effective the π–2π-averaging is at removing the edge artifacts.

Figure 5:
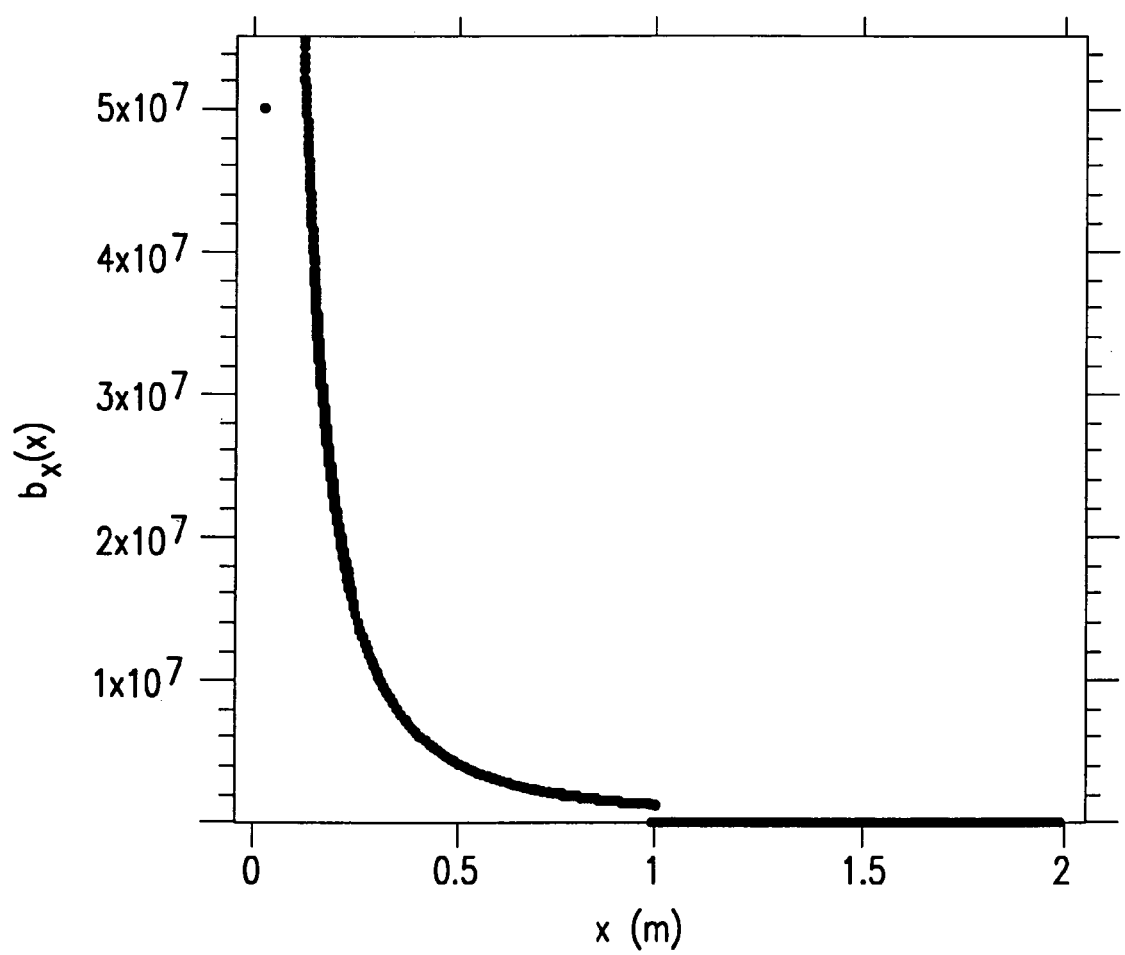
FIG. 5 is a diagram showing a simulated data set $b_x(x)$ that has been "padded" vs. x.

Returning again to FIG. 1, the first stage in the π–2π procedure, involves "padding" the end of the data set with N zeros in block 36 after the data has been acquired in block 32, and a set of N data points have been created in block 34, where N is the number of data points. FIG. 5 shows a simulated data set $b_x(x)$ that has been "padded". The choice of "padding" with zeros has proven to be a better technique than "padding" with a constant. This becomes clear from Eq. 25 as it shows that if the extra $d_p$ (the "padded" data values) are zero, they do not affect the transform values. Thus, the zero-padded-FFT is still the transform of the original data. The set of 2N data is created in block 38.

Figure 6:
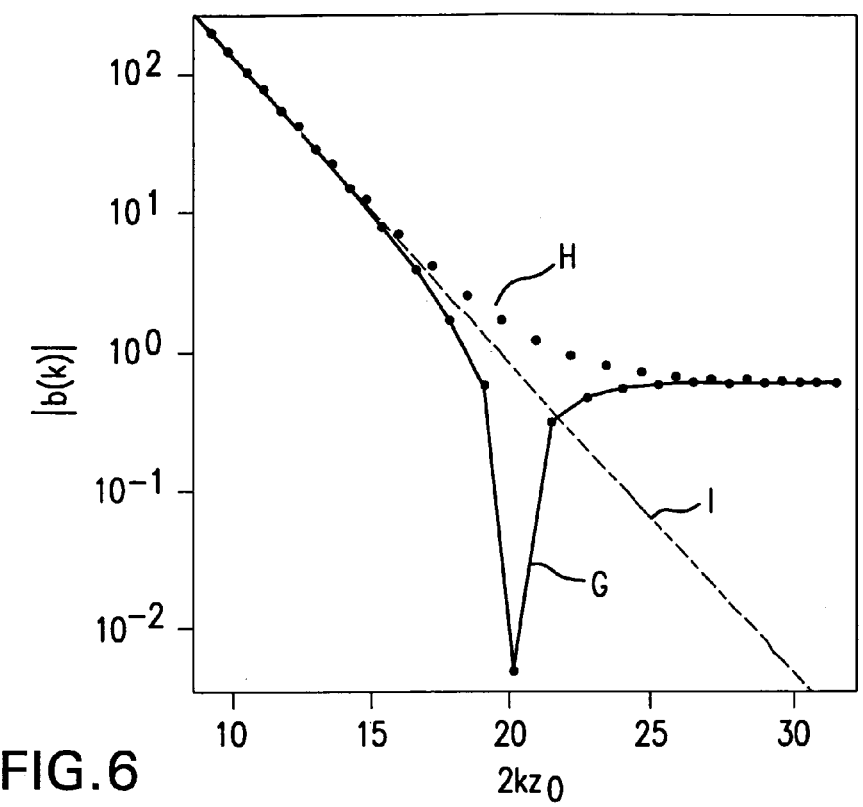
FIG. 6 is a diagram showing the absolute value of b(k) presented as three curves: the standard FFT of $b_x(x)$, shown as a solid line with the FFT of the "padded" data shown as a sequence of dots; and the theoretical $b_x(x)$ shown in dashed line.

The second stage of the π–2π procedure involves running the FFT on the padded data set in block 40. FIG. 6 illustrates the absolute value of three curves: the standard FFT of $B_x(x)$ (line G), the FFT of the padded data (dots H), and the theory $b_x(k)$ (line I). Here it can be seen that the π–2π FFT contains both the π and 2π factors. The resulting transform of the padded data (dots H) closely follows the standard FFT (line G) result until the region dubbed $k_{edge}$. For the transform of FIG. 4, it is noted that the $k_{edge}$ region begins around $2k_{edge}z_0 \sim 20$. In that region half of the π–2π-FFT points (H) follow the standard FFT (line G) while the other half are almost equal in magnitude but opposite in sign. The amplitude of the oscillation becomes roughly constant for large k. This can be seen on the right side of FIG. 6 where the π factors now lie on top of the standard FFT (this is an absolute value plot).

Figure 7:
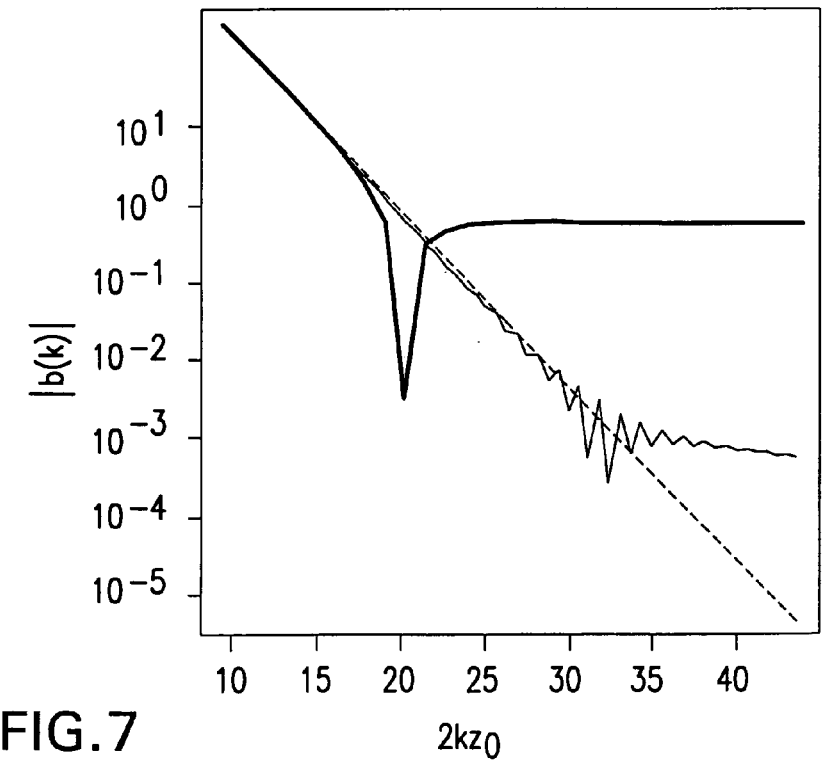
FIG. 7 is a diagram of $b_x(x)$ vs. $2kz_0$ showing the result of the averaging procedure.

The next step in the π–2π procedure is to average the π and 2π values in k-space as shown in block 42 of FIG. 1. There are several averaging schemes that can be used, and which will be presented infra herein. FIG. 7 illustrates the result of averaging with the scheme $$b'_x(k_n) = \frac{b_x(k_n) + b_x(k_{n+1})}{2} \qquad \text{(Eq. 27)}$$

It has been noted that the π–2π-averaged transform follows the theoretical $b_x(k)$ (with no edge effects) nearly 60% further in k-space than the standard FFT.

The final stage in the process includes:

(a) in block 44, filtering off high k values after some value $k_w$;

(b) in block 46, dividing b(k) set by Green's function g(k) to obtain i(k); and (c) applying the inverse FFT to obtain the result of step (b) I(x) in block 48.

There are several possible ways one might increase $k_w$, while reducing edge problems. For example, one could increase the image size and sample the data with a smaller step size. Both these possibilities will be explored infra herein and comparison of the increase in the image size, as well as using smaller measuring steps sizes with the result of $\pi$–$2\pi$-averaging will be analyzed.

Increasing Image Size

Figure 8:
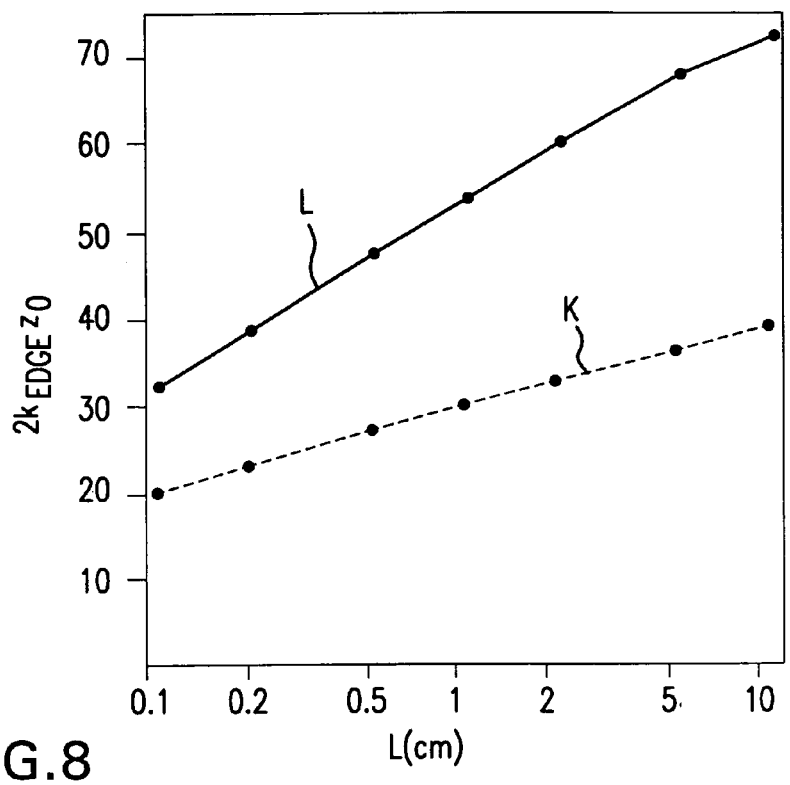
FIG. 8 is a plot of $2k_{edge}z_0$ as a function of image size L.

Increasing the image size is a viable way of reducing the edge artifacts. This approach works since a larger image's edges are clearly further away from the source when compared to the edges of a smaller image of the same source. The simple one-dimensional magnetic field from a long straight wire can be used to illustrate this point. FIG. 8 shows a graph of $2k_{edge}z_0$ vs. L for the standard FFT (line K) and for the FFT obtained after $\pi$–$2\pi$-averaging (line L). For this graph it has been assumed that there is a fixed pixel size of dx=5 µm. It can be seen that increasing the image size L causes displacement of the edge feature towards higher k values as expected for both the standard and $\pi$–$2\pi$-technique. However, for any given L, the $\pi$–$2\pi$ averaging produces an edge feature at higher values in k-space than the standard FFT technique. All $2k_{edge}z_0$ values of the $\pi$–$2\pi$ averaging are at least 50% higher than for the standard FFT, which means that for all image sizes, using the $\pi$–$2\pi$-averaging permits operation significantly further in k-space.

From the results presented in previous paragraphs it has been concluded that increasing the image size does reduce the edge problem. However, examination of FIG. 8 shows that one needs to use a much larger image to achieve the same $2k_{edge}z_0$ as permitted in the $\pi$–$2\pi$-averaging. Thus, the increasing of the image size is generally not as effective a method as using $\pi$–$2\pi$ averaging.

As an alternative approach, one could use both large scan sizes and $\pi$–$2\pi$-averaging. However, taking very large scans may be undesirable as it may be both resource and time consuming. It is important to be able to define how deep in k-space the inversion of a certain image will reach. A graph shown in FIG. 8 is helpful in practice since it provides a rough estimate of how much k-space is usable for a given image size. For example, for an L=1 cm picture, it should be possible to reach $2k_{edge}z_0$~55 if the $\pi$–$2\pi$-averaging is used. Moreover, only $2k_{edge}z_0$~30 can be reached if the standard FFT procedure is used.

Decreasing Pixel Size

Figure 9:
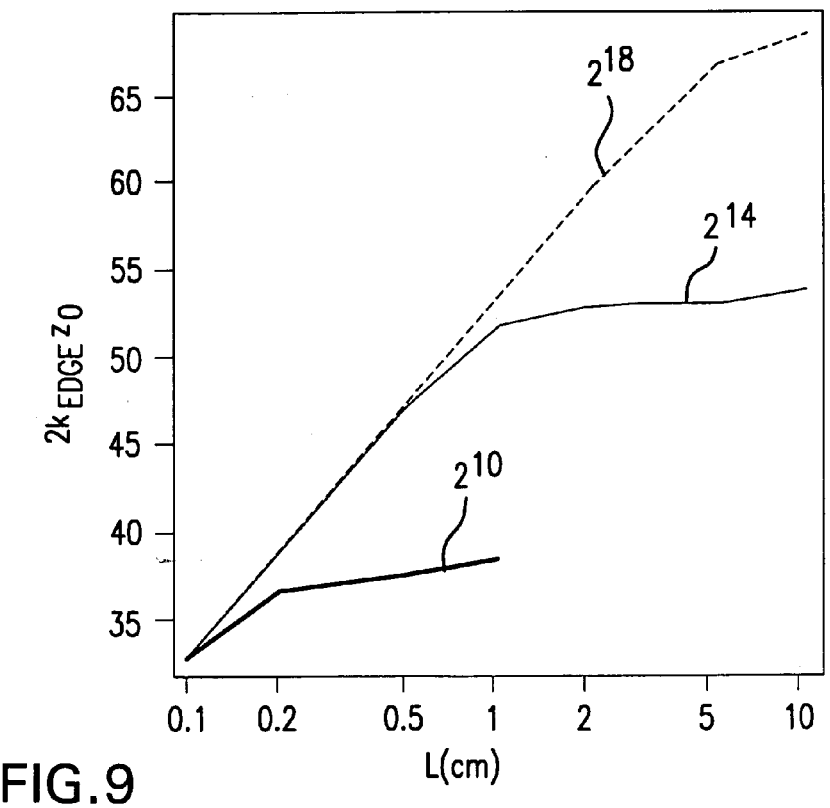
FIG. 9 is a diagram showing the relationship between number of points N, $2k_{edge}z_0$ and L.

Decreasing the pixel size is another possible way of increasing $k_w$ because $$k_{max} \approx \frac{2\pi}{dx}$$

where dx is the data step size. Increasing $k_{max}$ might allow increasing $k_w$ because it "pushes" the part of k-space where the edge information exists (which is high-values of k) further from the portion of k-space where it would be in the case of an image of smaller $k_{max}$. This is shown in a $2k_{edge}z_0$ vs. L graph presented in FIG. 9 as three curves—each curve representing the same prior magnetic field, but with a different number of points ($2^{18}$, $2^{14}$, $2^{10}$). For a fixed image length, as the number of points increases, so does $2k_{edge}z_0$ up to a certain maximum. The relationship is roughly $2k_{edge}z_0 \approx \log(N)$. Thus at L=1 mm, there is no difference between the number of points used, while at L=1 cm there is a difference between the $N=2^{14}$ and $N=2^{18}$. The conclusion is that the size dx (data acquisition step) has to be small enough so that $2k_{edge}z_0$ is maximized. However, the size dx does not have to be too small considering time required for taking data.

The Two-dimensional $\pi$–$2\pi$ Inversion

Figure 10:
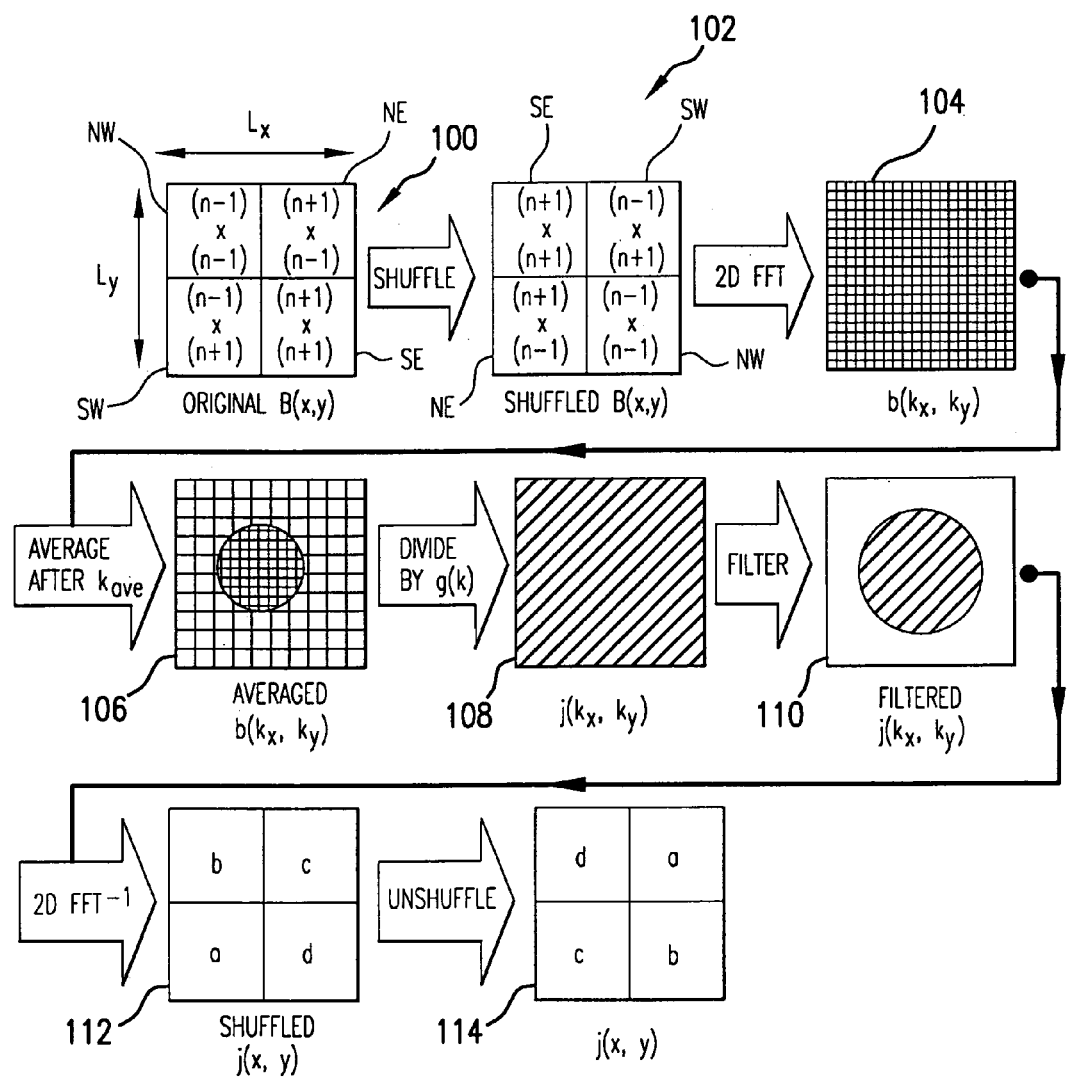
FIG. 10 is a schematic representation of the two-dimensional process of the present invention for implementing the $\pi$–$2\pi$ averaging in a real data set.

The two-dimensional $\pi$–$2\pi$-process is closely related to the one-dimensional process described supra. It is essentially the one-dimensional process done sequentially in both the x and y directions. FIG. 10 shows schematically the entire 2-D process for implementing the $\pi$–$2\pi$-averaging in a real data set.

The two-dimensional $\pi$–$2\pi$-FFT differs from the one dimensional process in that instead of "padding" the data acquired during the measurement step with zeros, the two dimensional data array (of the magnetic field values over the sample) is divided into 4 quadrants as shown in block 100 of FIG. 10. These quadrants of the data array 100, namely NW, NE, SE, and SW, are methodically shuffled. The relationship with the one-dimensional process is as follows: considering that the data actually consisted of both positive and negative values of the magnetic field, then what the shuffling does is to take the left side of the field and place it to the right of the right side. In a two dimensional realm, the same needs to be done in the other direction. More precisely, the image is cut in half in the y-direction and the lower half is placed above the top half. That image is then cut in half in the x-direction and the left side is placed to the right of the right side. As the result of shuffling, the shuffled set is created in block 102 shown in FIG. 10.

Figure 11A:
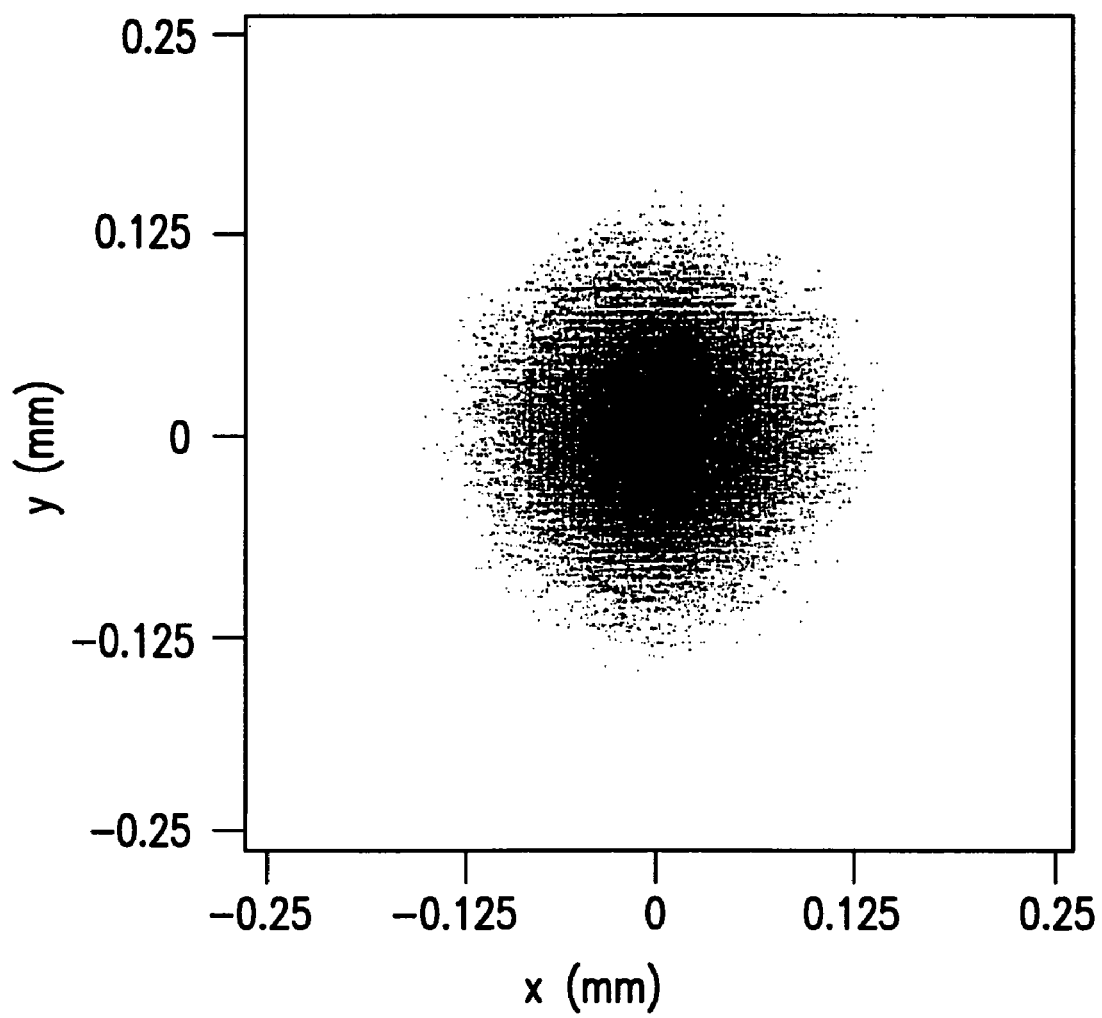
FIG. 11A is an intensity plot of the magnetic field of a centered $\delta$-function current density for an image of N=100×100 points.
Figure 11B:
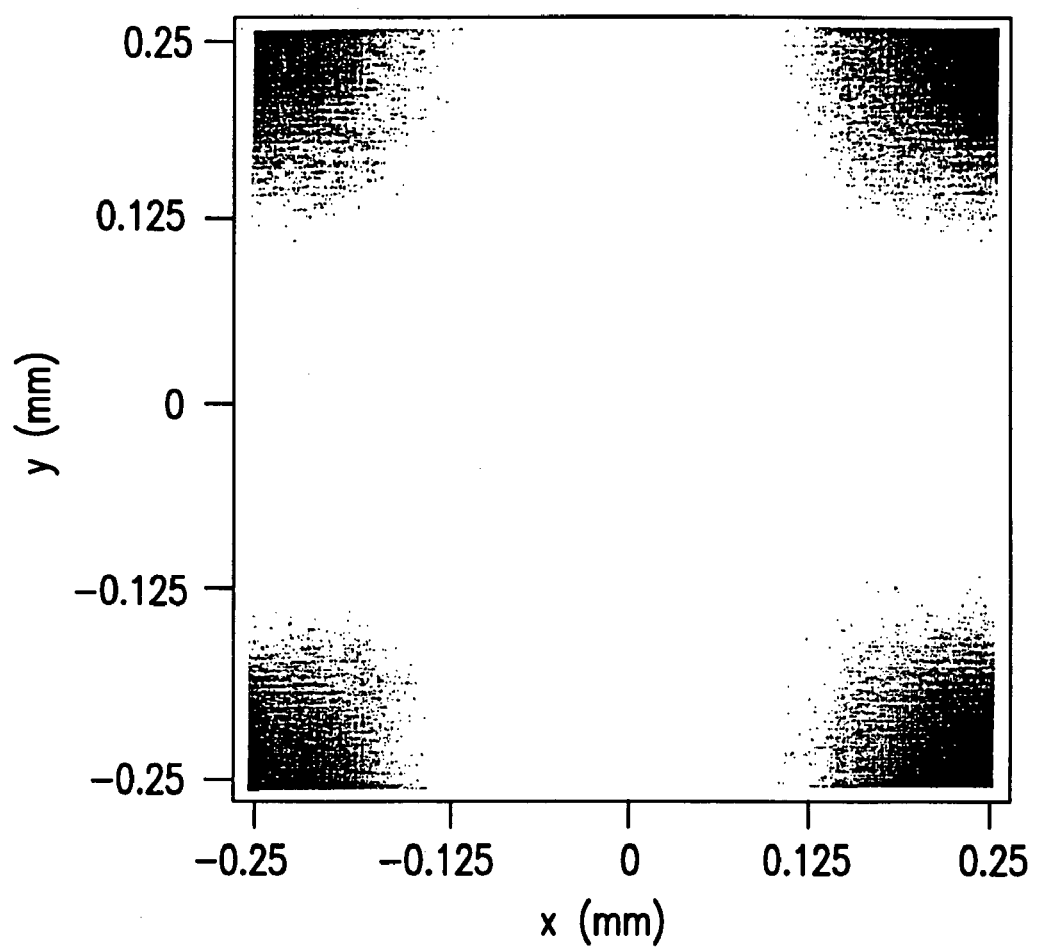
FIG. 11B illustrates the shuffled data.

FIGS. 11A and 11B illustrate the shuffling process on the magnetic field produced by an infinitely small delta-function current-density source. FIG. 11A is an intensity plot of the magnetic field of a centered delta-function current-density for an image of N=100×100 points and dx=5×10$^{-6}$ m. The field has the form $$b_x(x, y) = \frac{1}{(x^2 + y^2 + z^2)^{\frac{3}{2}}}$$

with $z_0=10^{-4}$ m. It peaks at (0.0) and decays smoothly and evenly towards all directions. In FIG. 11B, the shuffled data looks as if it were four such magnetic fields except centered at the four corners of the image and decreasing towards the center.

For the purposes of the FFT, this shuffling process is mathematically identical (for each of the four quadrants) to the "padding" of each of the four quadrants with zeros in x and y directions, running the FFT on each of the padded quadrants and reassembling the results. However, the shuffling permits the processing of data in a more efficient way by running the FFT only once on the shuffled set 102 shown in FIG. 10. At the conclusion of the processing the result is unshuffled.

Referring again to FIG. 10, the 2D FFT is applied to the set 102 to create a two-dimensional k-space in block 104. Then averaging of said $b(k_x,k_y)$ values of the two-dimensional k-space takes place in block 106. Further, the $b(k_x,k_y)$ values are converted into representations of current densities $i(k_x,k_y)$ in the k-space by dividing $b(k_x,k_y)$ of block 104 by g(k) in block 108. The current densities $i(k_x,k_y)$ are further filtered in block 110.

Subsequently, the inverse FFT is applied to the current densities $i(k_x,k_y)$ to obtain a shuffled two-dimensional set of current densities I(x,y) in block 112, and the shuffled two-dimensional set of current densities 112 is unshuffled in block 114 to obtain the map of current densities I(x,y).

Figure 12A:
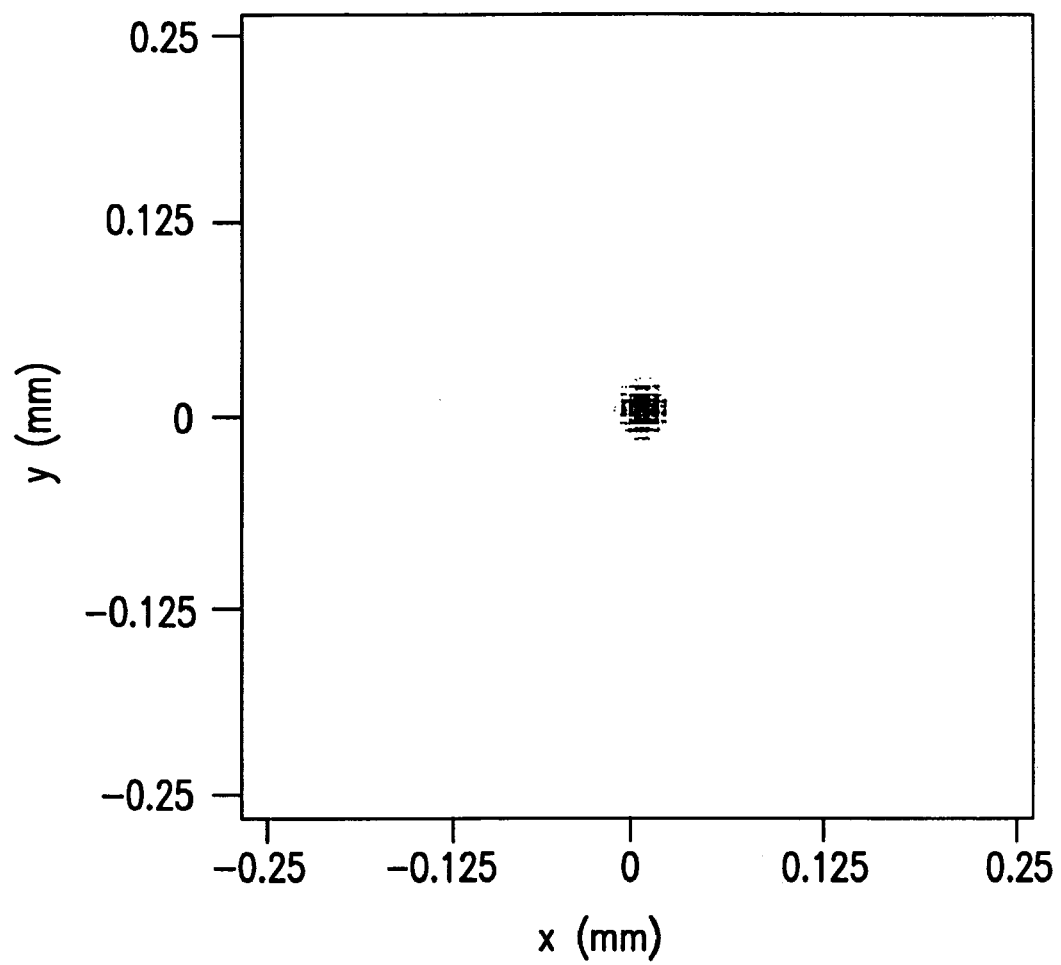
FIG. 12A illustrates the results of the full inversion for the standard FFT.
Figure 12B:
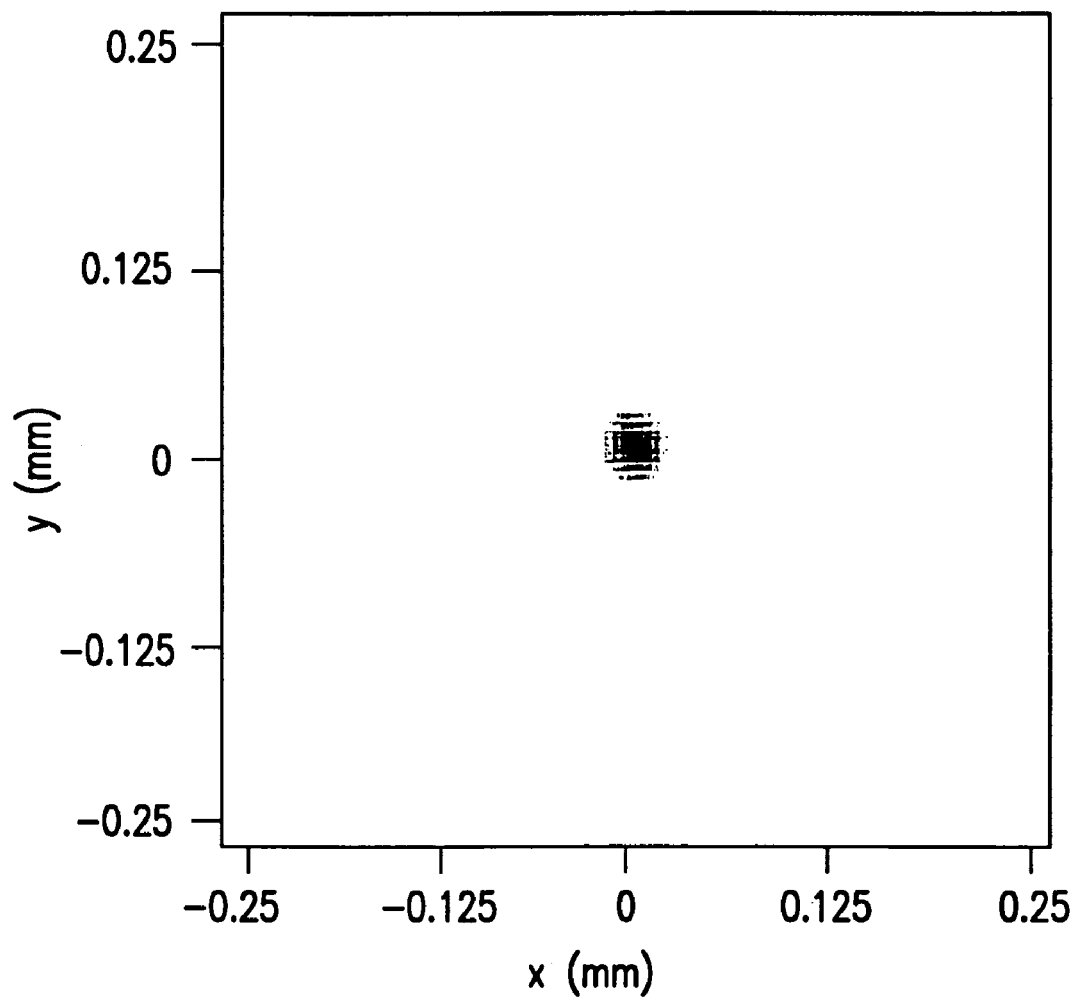
FIG. 12B shows the results of the full inversion for the $\pi$–$2\pi$ FFT of the present invention.
Figure 12C:
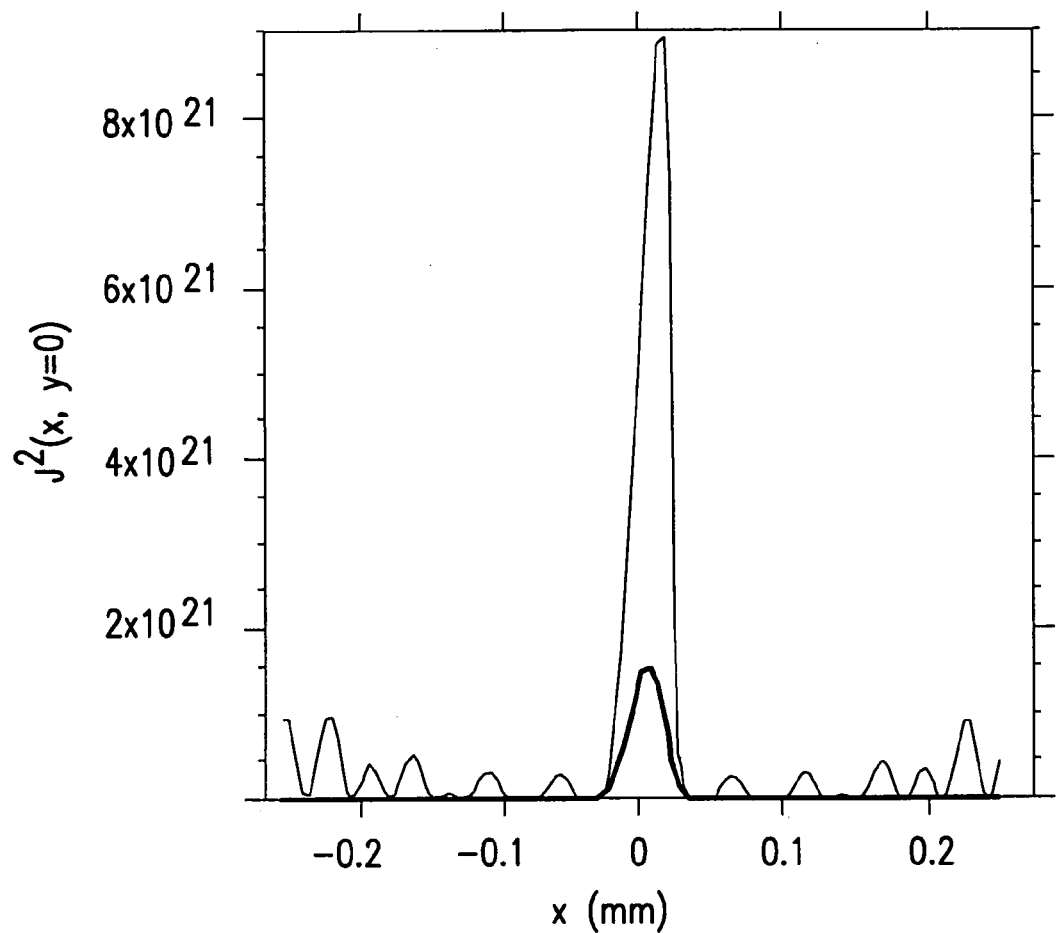
FIG. 12C is a cut across FIGS. 12A and 12B showing $J^2(X, Y=0)$ vs. X.

The results of the standard inversion may be compared with those of the $\pi$–$2\pi$-inversion for two examples which use the same magnetic field yet different cut off $k_w$. The averaging scheme used in both examples is $$b_x(k_n) = \frac{b_x(k_n) + b_x(k_{n+1})}{2},$$

starting at n=2 (the second element of the data set). The first example uses a relatively small value for $k_w$ and the second uses a larger value for $k_w$. A study of both these regimes serves well to illustrate how the $\pi$–$2\pi$-averaging is able to improve the image. The first example uses $k_w$=22.6 and is illustrated in FIG. 12A which shows $J^2(x, y)$ from the standard inversion. FIG. 12B shows $J^2(x, y)$ after the $\pi$–$2\pi$-inversion. FIG. 12C shows a line cut across the center of the image ($J^2(x, y)$ vs. x) for both schemes. As can be seen in FIGS. 12A–12C, a standard inversion that uses $k_w$=22.6 has begun to introduce the edge artifacts. This is seen in the rippling evident in the standard inverse of the FIG. 12C—the edge effects peak at around one-eighth the peak of the true signal. For the same $k_w$ however, the $\pi$–$2\pi$-inversion has eliminated nearly all edge effects.

Figure 13A:
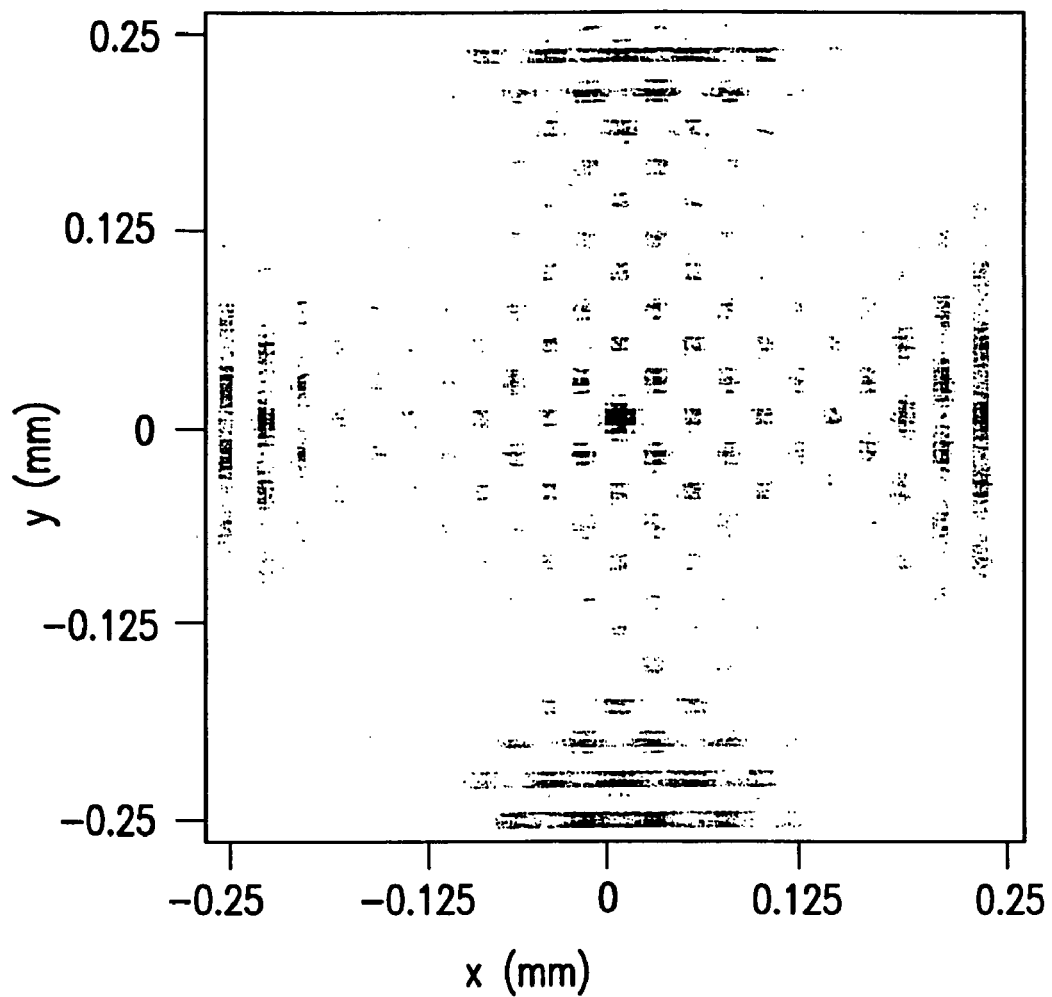
FIGS. 13A, B and C show the results of the standard FFT (FIG. 13A), the results of the π–2π FFT (FIG. 13B), and a cut across both FIGS. 13A and 13B showing $J^2(X, Y=0)$ vs. X for $2k_w z_0 = 27.6$.
Figure 13B:
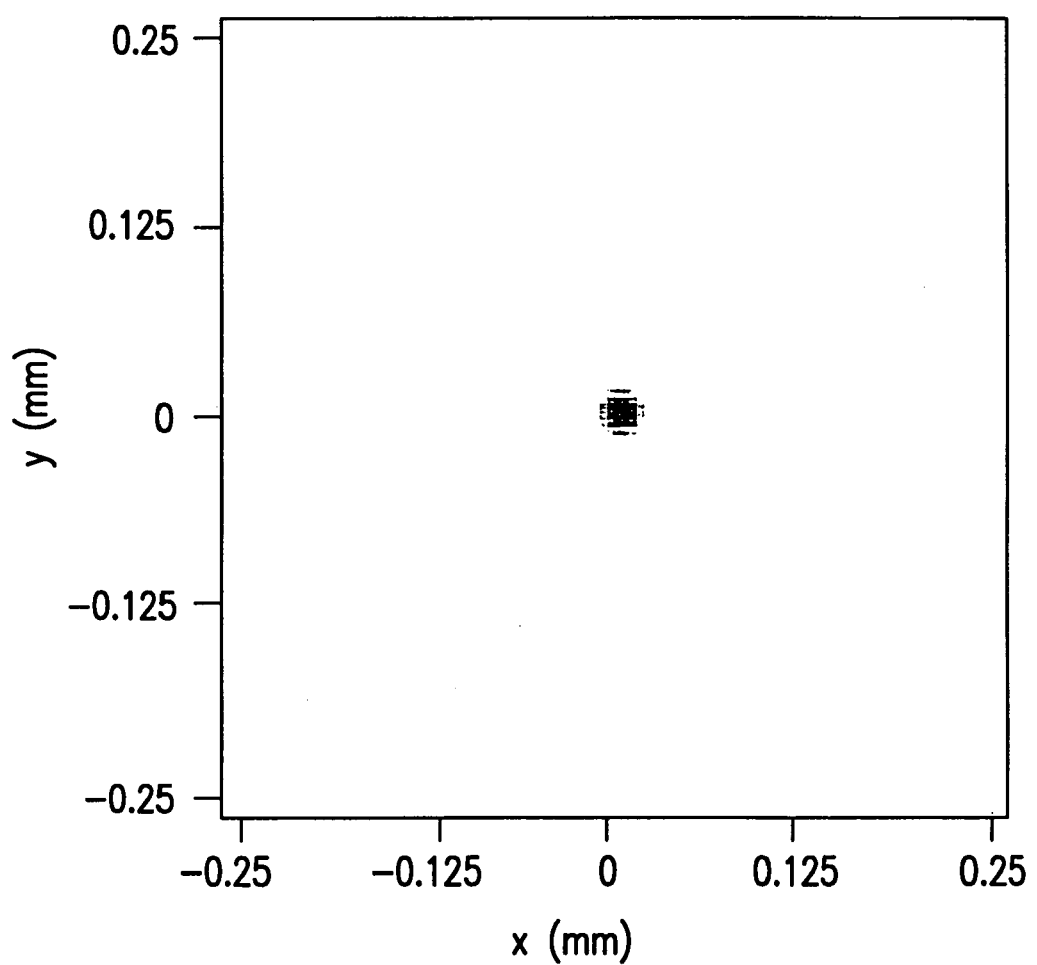
Figure 13C:
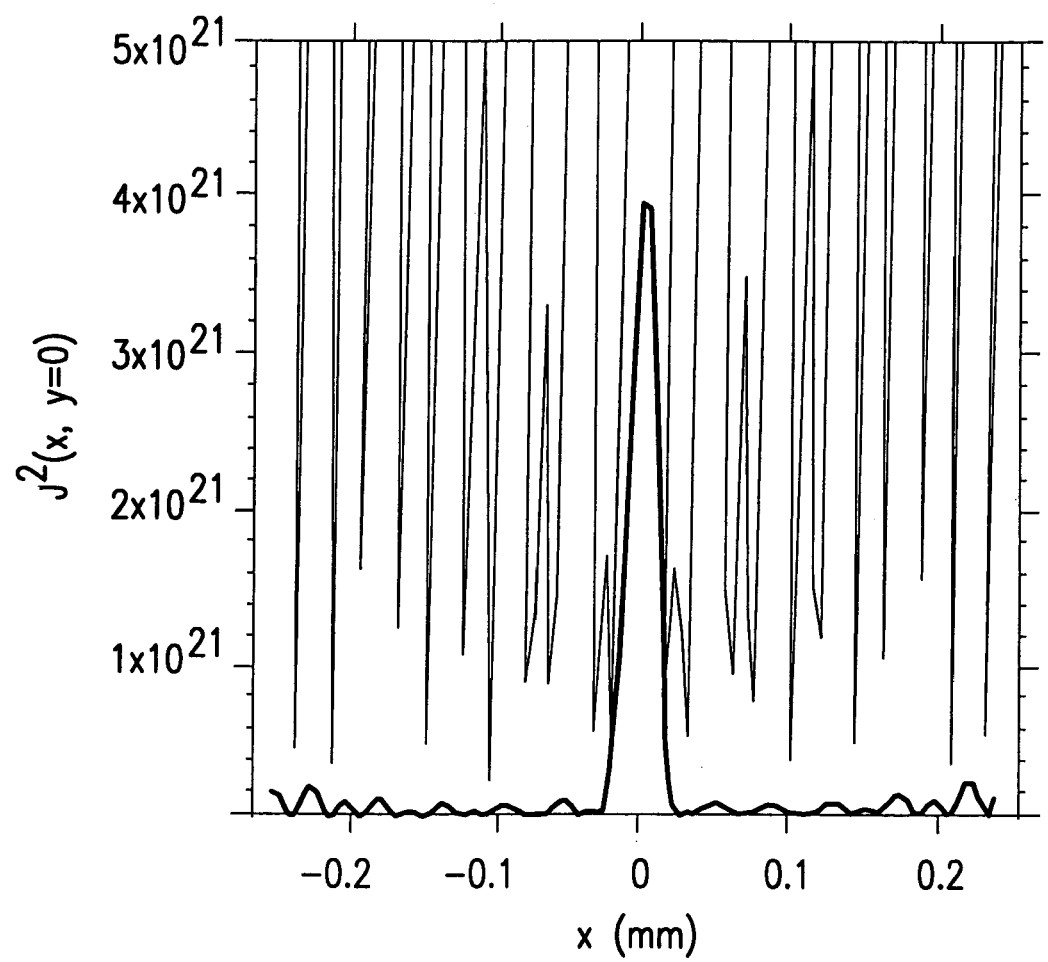

The second example uses $k_w$=27.6 and is illustrated in FIGS. 13A–13C which follow the same format as FIGS. 12A–12C. Thus, FIG. 13A is an intensity plot of the standard inversion, and FIG. 13B shows an intensity plot of the $\pi$–$2\pi$-inversion. FIG. 13C is a line cut across the center of the image showing $J^2(x, y=0)$ vs. x for both schemes. As can be seen from FIGS. 13A–13C, a standard inversion that uses $k_w$=27.6 is completely dominated by edge effects and the source can no longer be recognized. The $\pi$–$2\pi$-inversion on the other hand, still shows a strong peak where the source is expected to be although it is beginning to show some edge effects, which are quite small.

Averaging the $\pi$–$2\pi$ Values

There are several different schemes that can be used to average the result of a $\pi$–$2\pi$-FFT. The basic scheme is $$b(k_n) = \frac{b(k_n) + b(k_{n+1})}{2}$$

along each direction in k-space. It is also possible to double-average the points, that is, to average the data twice using the same formula. This is equivalent to averaging both of a point's neighbors such as in the formula:

$$b(k_n) = \frac{b(k_{n+1}) + 2b(k_n) + b(k_{n+1})}{4} \quad \text{(Eq. 28)}$$

One issue that is just as important as the formula used is which points are averaged. By the basic scheme, the last point cannot be averaged. By considering both of point's neighbors neither the first nor the last point can be averaged. However, the last point is almost always cut out by $k_w$, and the first point is not averaged in order to get a correct value of I(x). As was presented in FIG. 6, the $\pi$ and $2\pi$ points begin changing sign only after a certain region that was dubbed as $k_{edge}$. The discussion presented infra, addresses the issue of what are the effects of averaging the points before $k_{edge}$.

Figure 14:
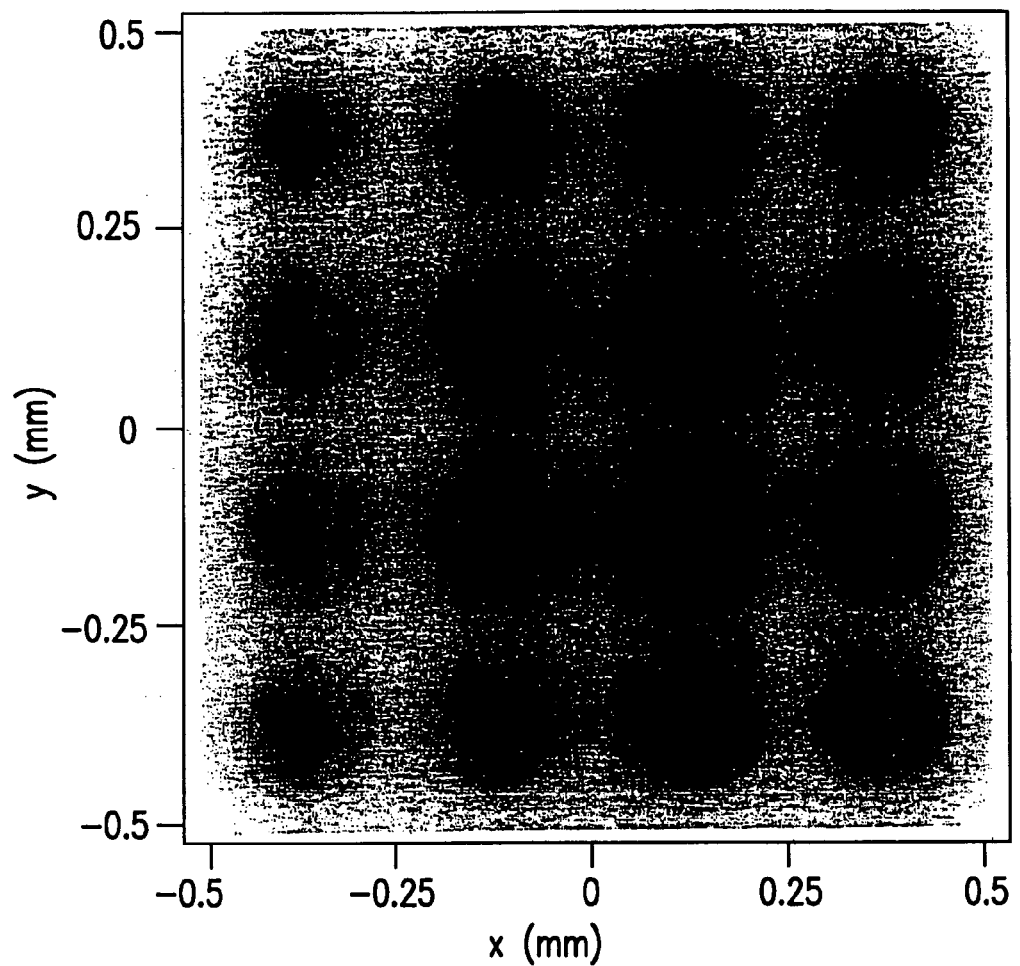
FIG. 14 is a diagram representing the magnetic field produced by 4×4 grid arrangement of δ-function sources.
Figure 15A:
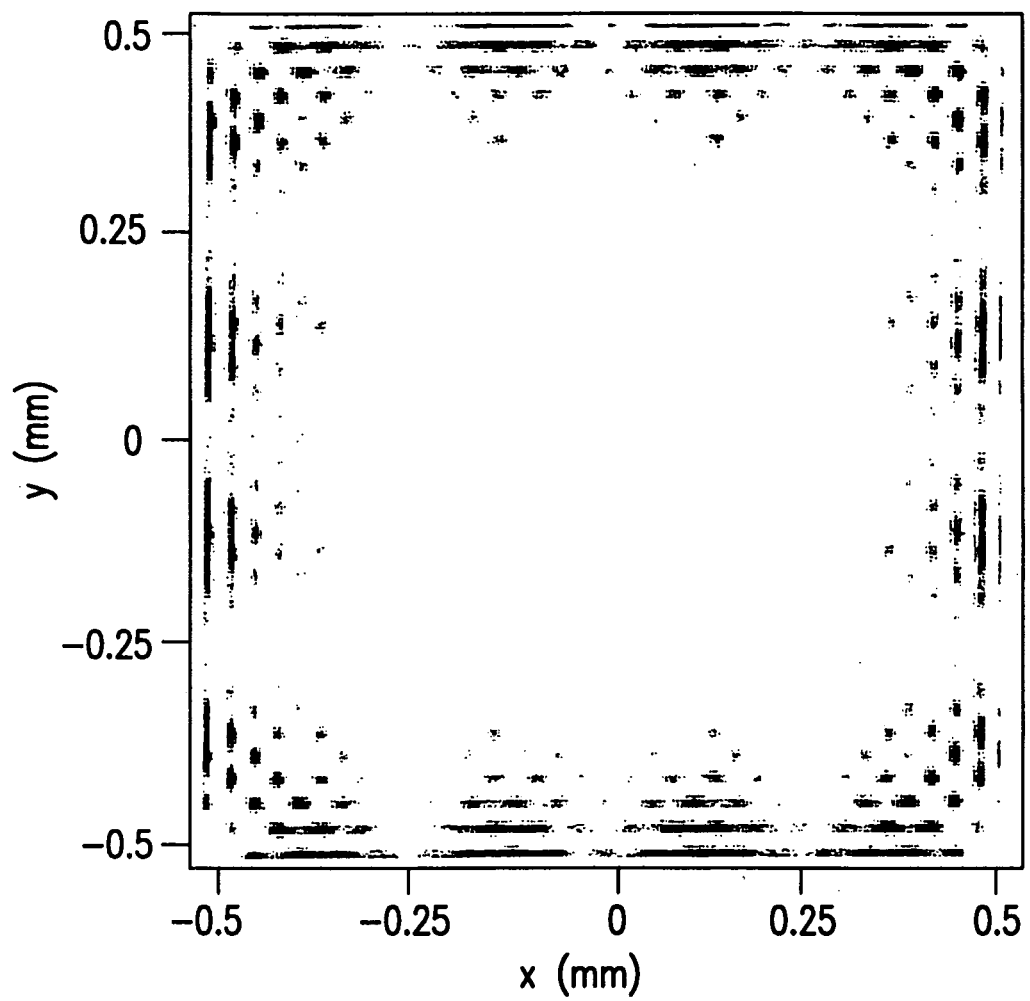
FIG. 15A is a diagram representing the standard inversion of the field produced by the grid of the δ-functions of FIG. 14.
Figure 15B:
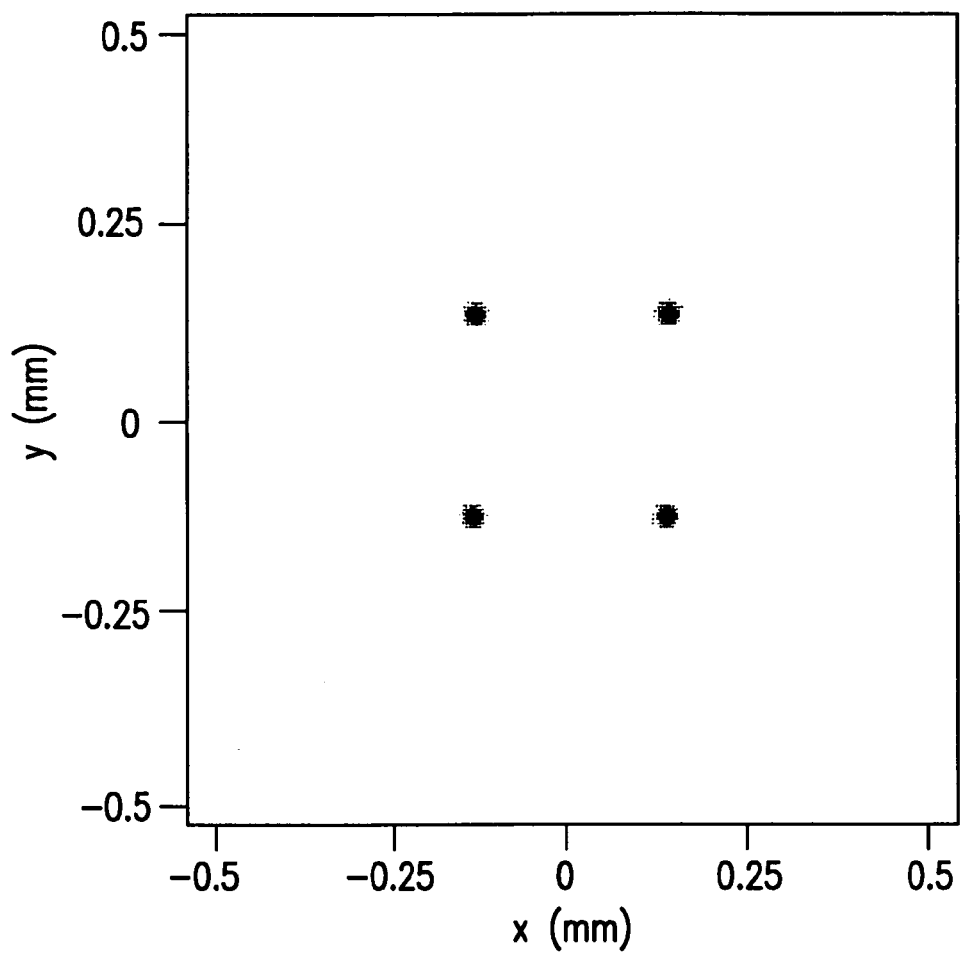
FIG. 15B is a diagram representing the π–2π inversion of the grid of δ-functions.
Figure 15C:
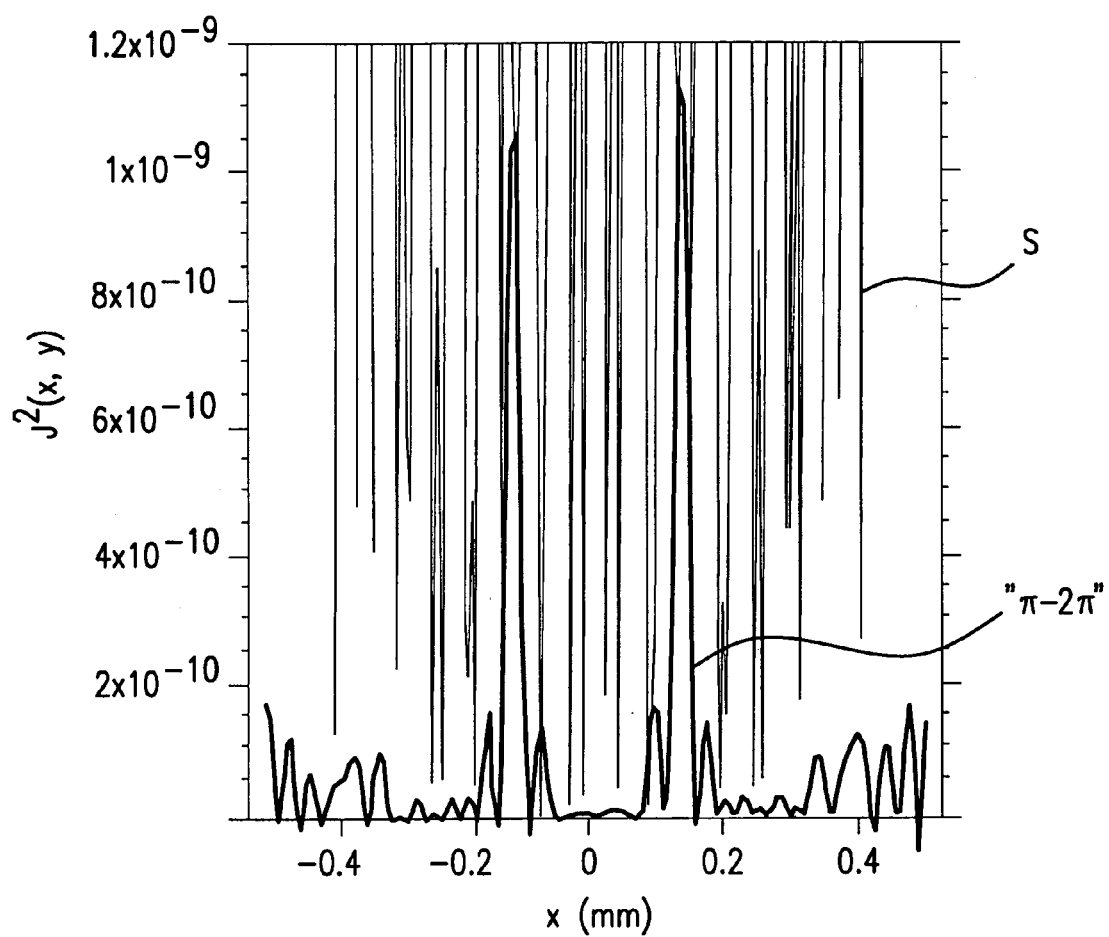
FIG. 15C is a graph showing a cross-section of FIGS. 15A and 15B presented as a diagram of $I^2(x,y)$ vs. x.

Herein, $k_{ave}$ is defined as the k-value at which the averaging begins. For all the $\pi$–$2\pi$ simulations, averaging is run up to the point $k_{ave}$=dk (the first non-zero k-value), as the basic averaging scheme has been used starting at the second element of the $\pi$–$2\pi$-transform. To see the effects of different values of $k_{ave}$, inversions have been performed on the magnetic field $B_x(x, y)$ produced by 16 delta-function sources arranged in a 4 by 4 grid. The field is contained in a 1 mm×1 mm image, as shown in FIG. 14. In these inversions, $2k_w z_0$=22.6, N=200×200 points and $z_0$=1 mm. As shown in FIG. 15A, at this value of $k_w$ the standard inversion is clearly dominated by edge effects. The $\pi$–$2\pi$ inversion, shown in FIG. 15B, has mostly eliminated the edge effects but has also dampened the sources closer to the edge. This is not too surprising since it completely erases the edge artifact. FIG. 15C is a cross-section of the graphs of FIGS. 15A and 15B, that shows $J^2(x, y)$ vs. x across ⅖ of the image (where the peaks of the second row of sources are located). The standard inversion, represented by the curve S of FIG. 15C, is completely dominated by edge artifacts, while the damping produced by the $\pi$–$2\pi$ inversion, represented by the curve "$\pi$–$2\pi$", is clear since the peaks close to the edge do not show.

Figure 16A:
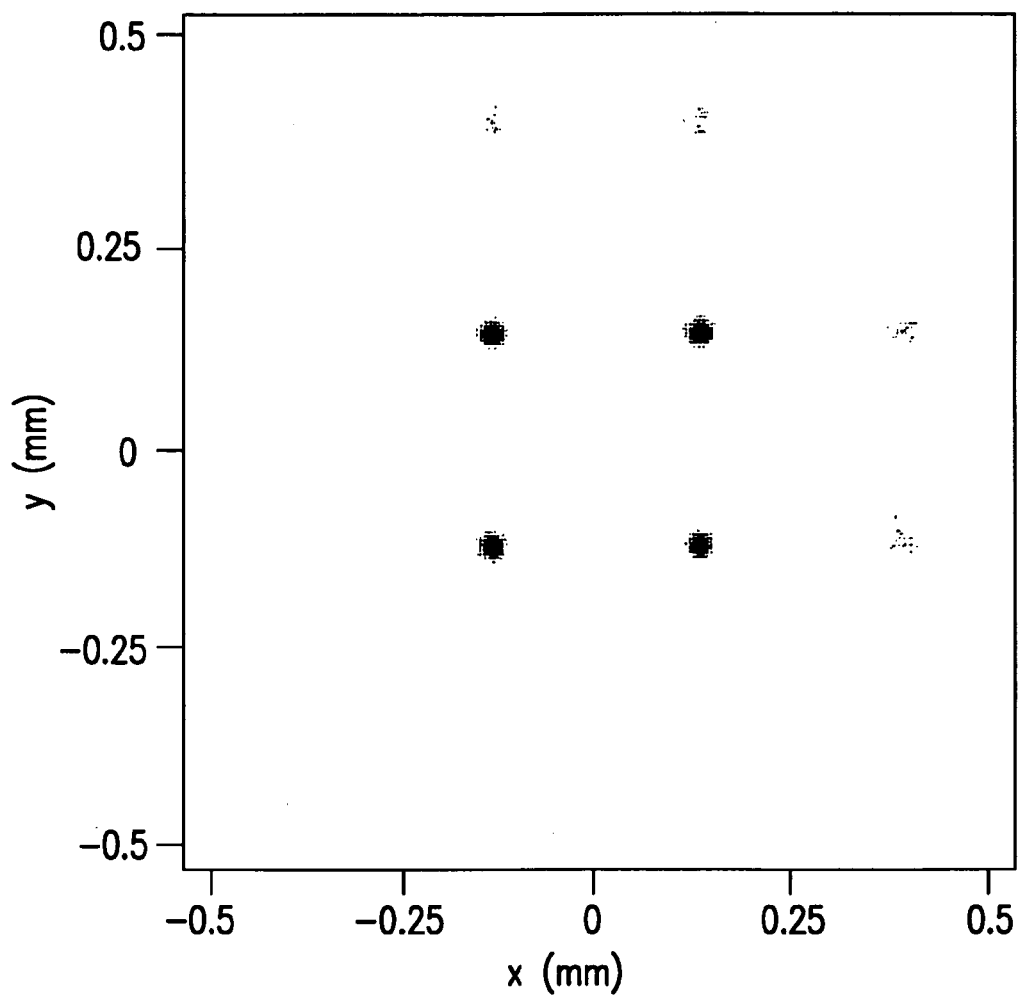
FIG. 16A is an intensity plot of the π–2π inversion of the δ-function grid with $2k_{ave} z_0 = 10.1$.
Figure 16B:
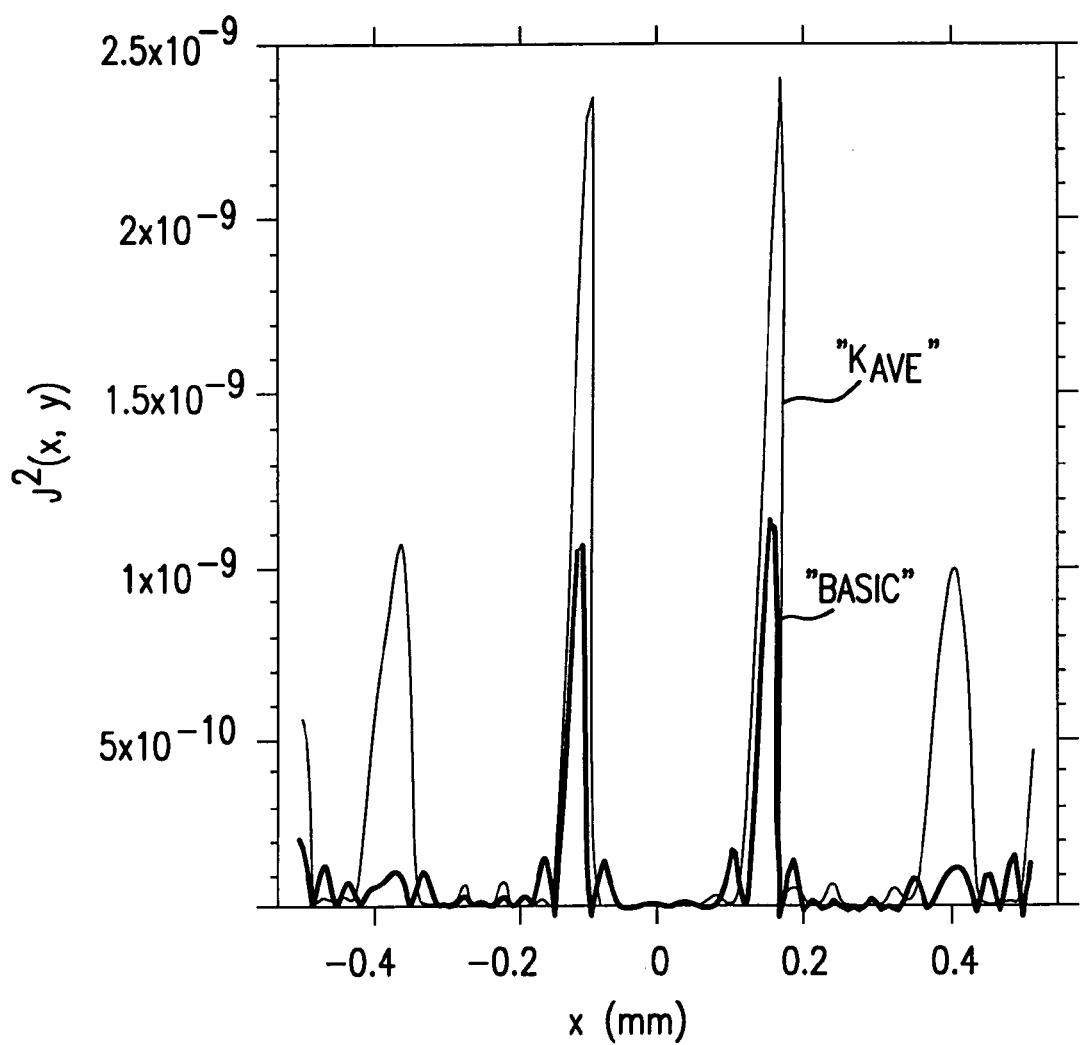
FIG. 16B is a cross-section graph of $J^2(x,Y)$ vs. X that shows two curves, a respective $k_{ave}$ inversion and the basic averaging with $k_{ave} = dk$.
Figure 17A:
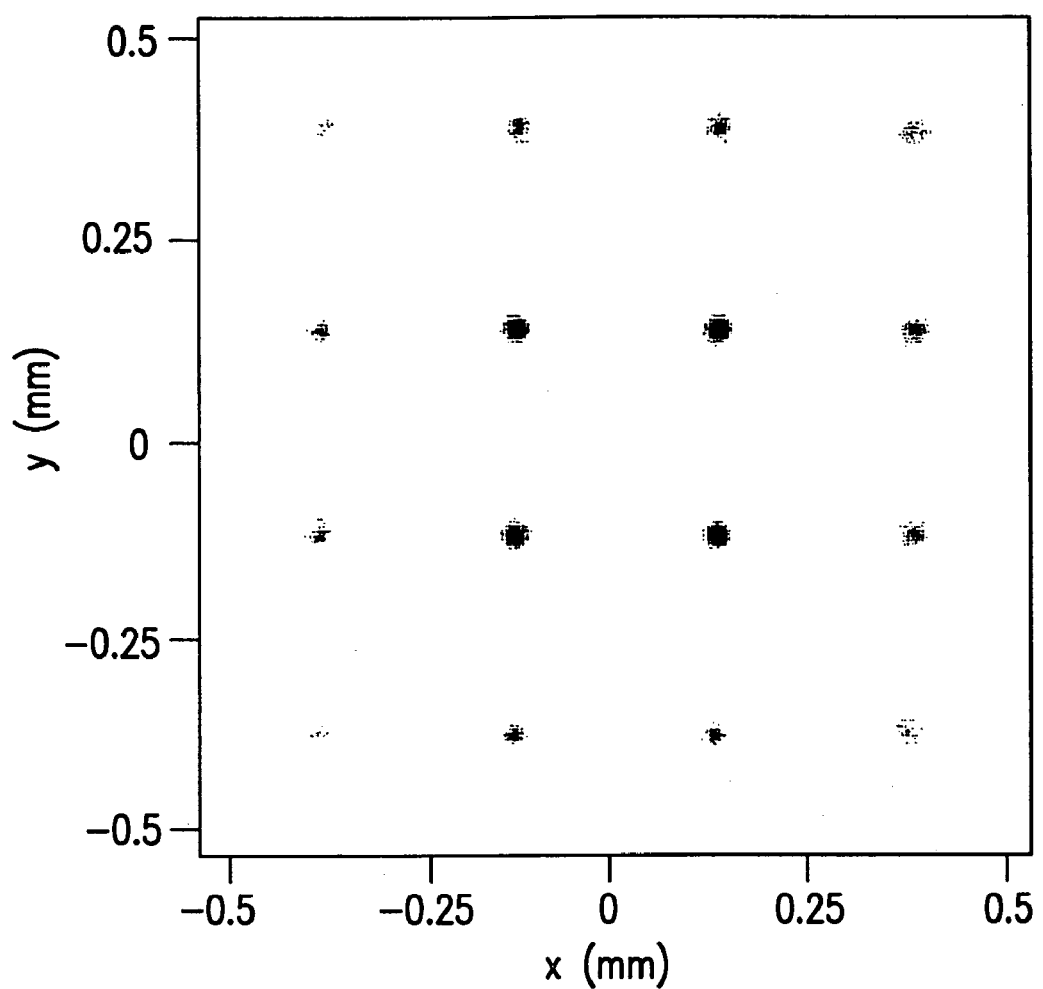
FIGS. 17A and 17B are respectively an intensity plot of the π–2π inversion of the δ-function grid with $2k_{ave} z_0 = 15.1$ and a cut across the intensity plot that shows the basic inversion and the $2k_{ave} z_0 = 15.1$ inversion.
Figure 17B:
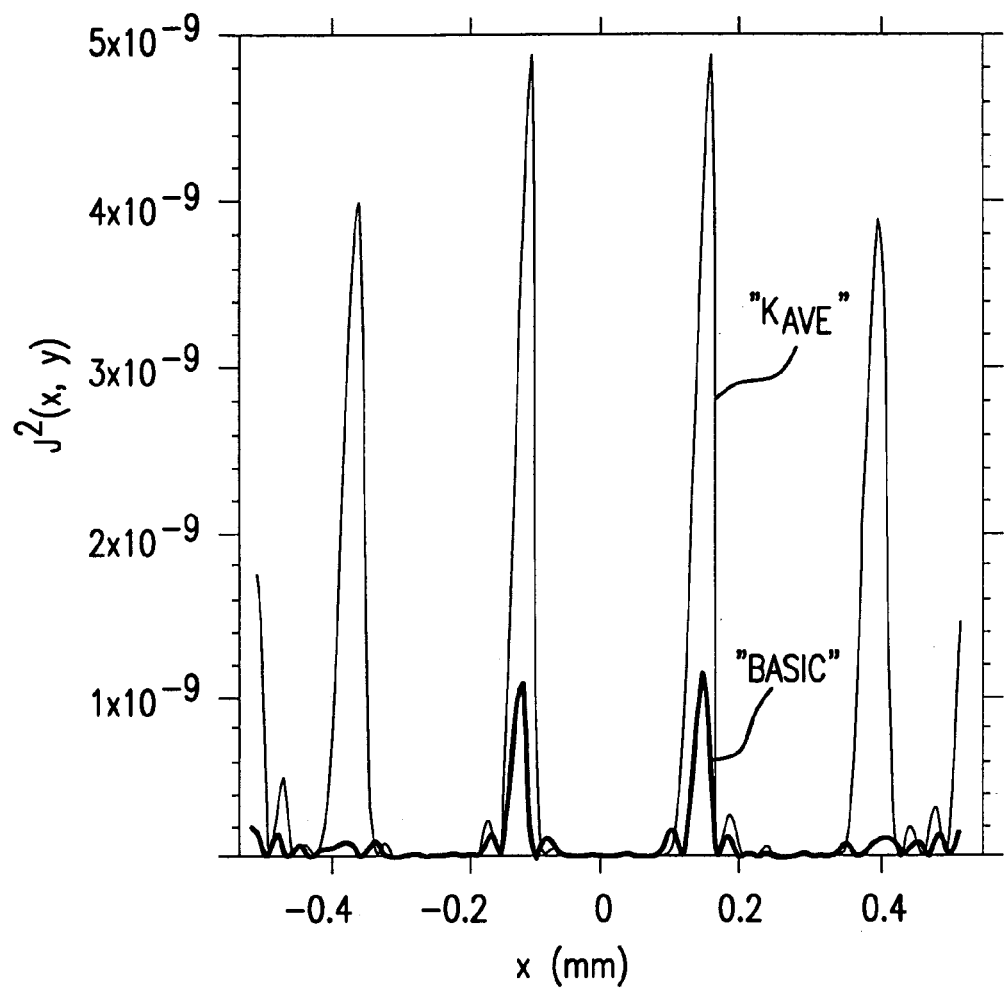
Figure 18A:
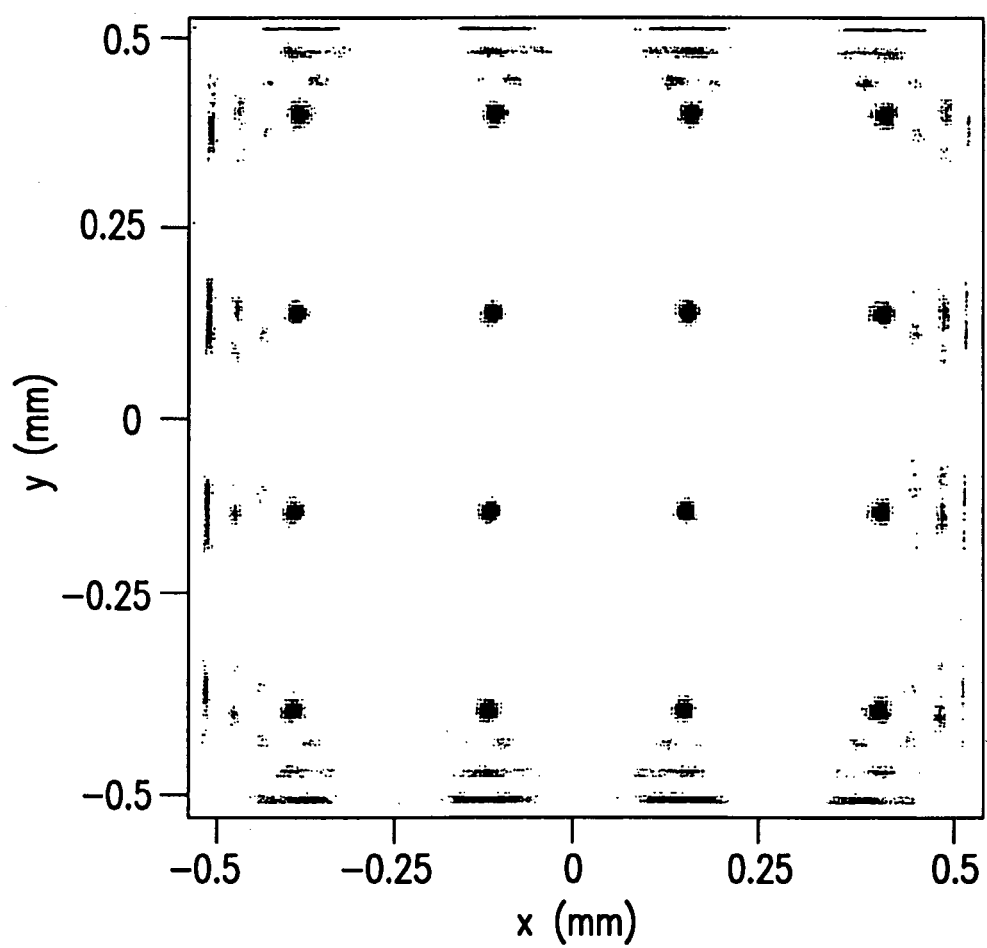
FIGS. 18A and 18B are respectively an intensity plot of the π–2π inversion of the δ-function grid with $2k_{ave} z_0 = 18.8$, and a cut across the intensity plot that shows the basic inversion and the $2k_{ave} z_0 = 18.8$ inversion.
Figure 18B:
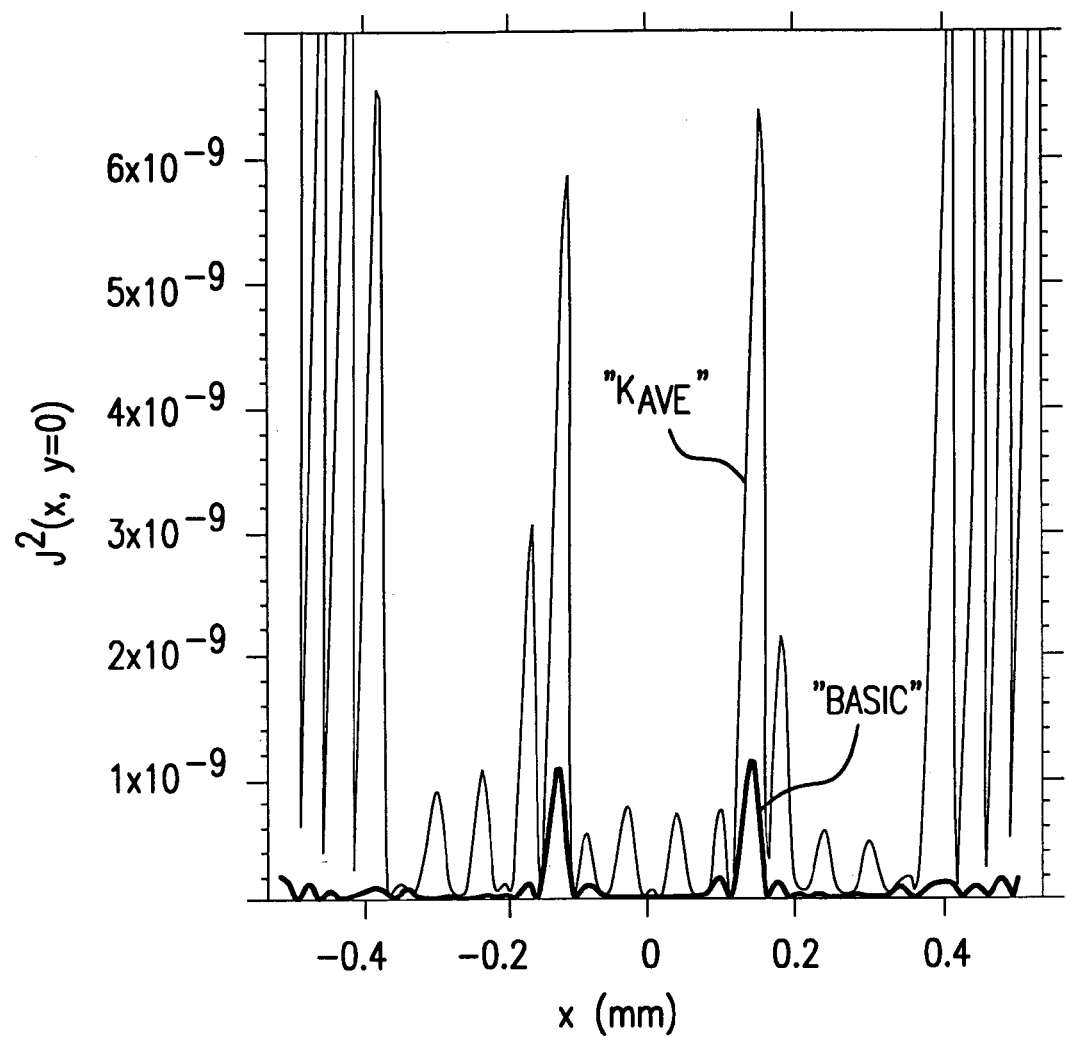

The extent of the $\pi$–$2\pi$ edge damping can be changed by changing $k_{ave}$. If the averaging starts as close to $k_{edge}$ as possible, the outcome should be the least dampened yet still remove edge artifacts. The discussion infra centers on three examples: $k_{ave}$<$k_{edge}$, the best $k_{ave}$, and $k_{ave}$>$k_{edge}$. FIGS. 16A and 16B illustrate the intensity plot at $2k_{ave}z_0$=18.8. These follow the same format: FIGS. 16A, 17A, and 18A illustrate an intensity plot of the $\pi$–$2\pi$ inversion using its respective $k_{ave}$, while FIGS. 16B, 17B, and 18B represent a cross-section graph of $J^2(x, y)$ vs. x that shows two curves: its respective $k_{ave}$ inversion (line "$k_{ave}$") and the basic averaging with $k_{ave}$=dk (line "Basic"). It may be seen from FIGS. 16–18 that the height of the peaks increases as $k_{ave}$ increases. However once $k_{ave}$ surpasses $k_{edge}$, edge effects begin to arise. This occurs since the $k_{edge}$ region is not being averaged so it is equivalent to the standard FFT inversion.

Figure 19A:
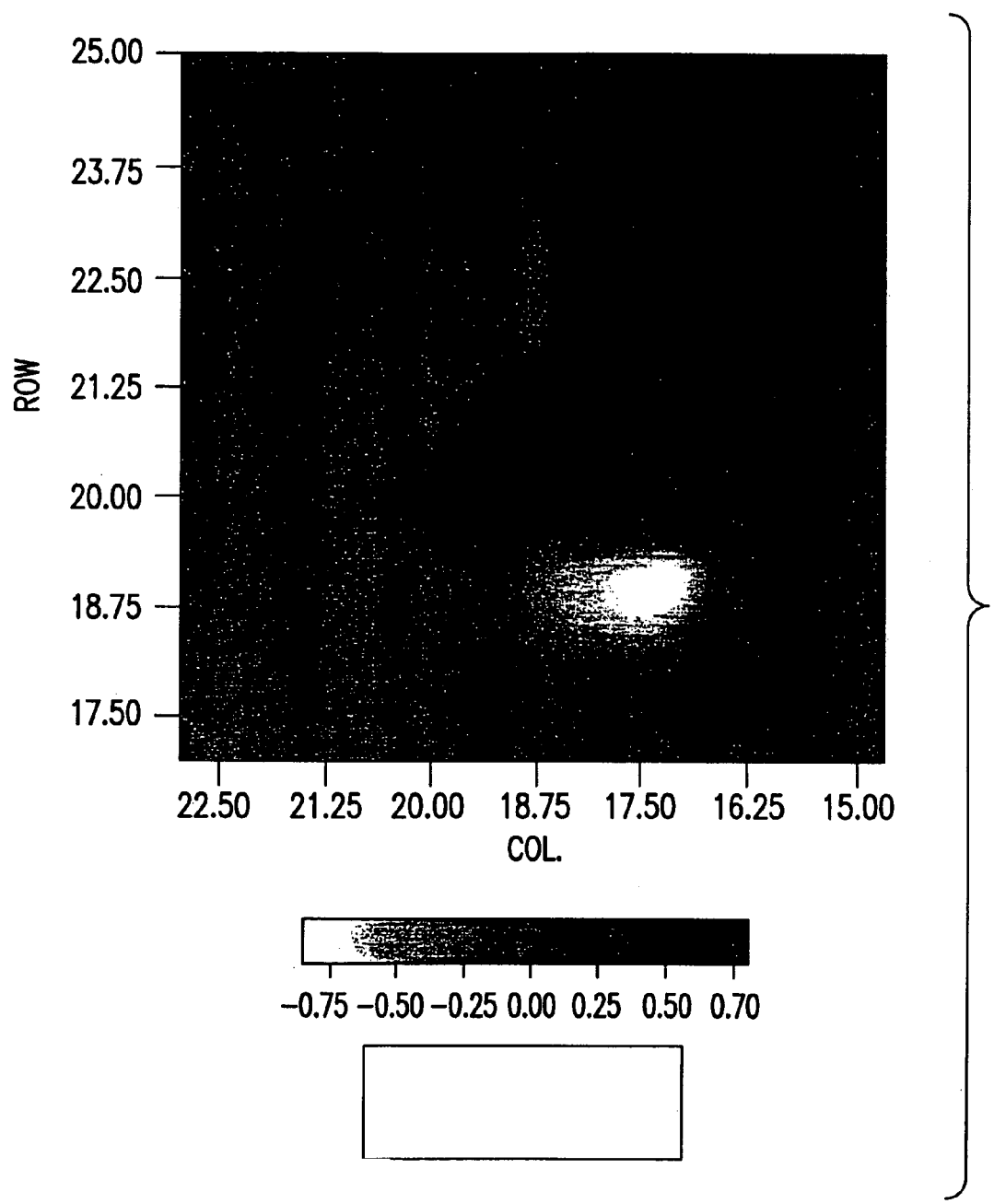
FIGS. 19A, B and C are respectively the diagrams showing the Z components of the magnetic field produced by a shorted wire at different layers of a computer chip, the standard inversion using $2k_w z_0 = 20$, and the π–2π inversion using $2k_w z_0 = 20$ and $2k_{ave} z_0 = 10$.
Figure 19B:
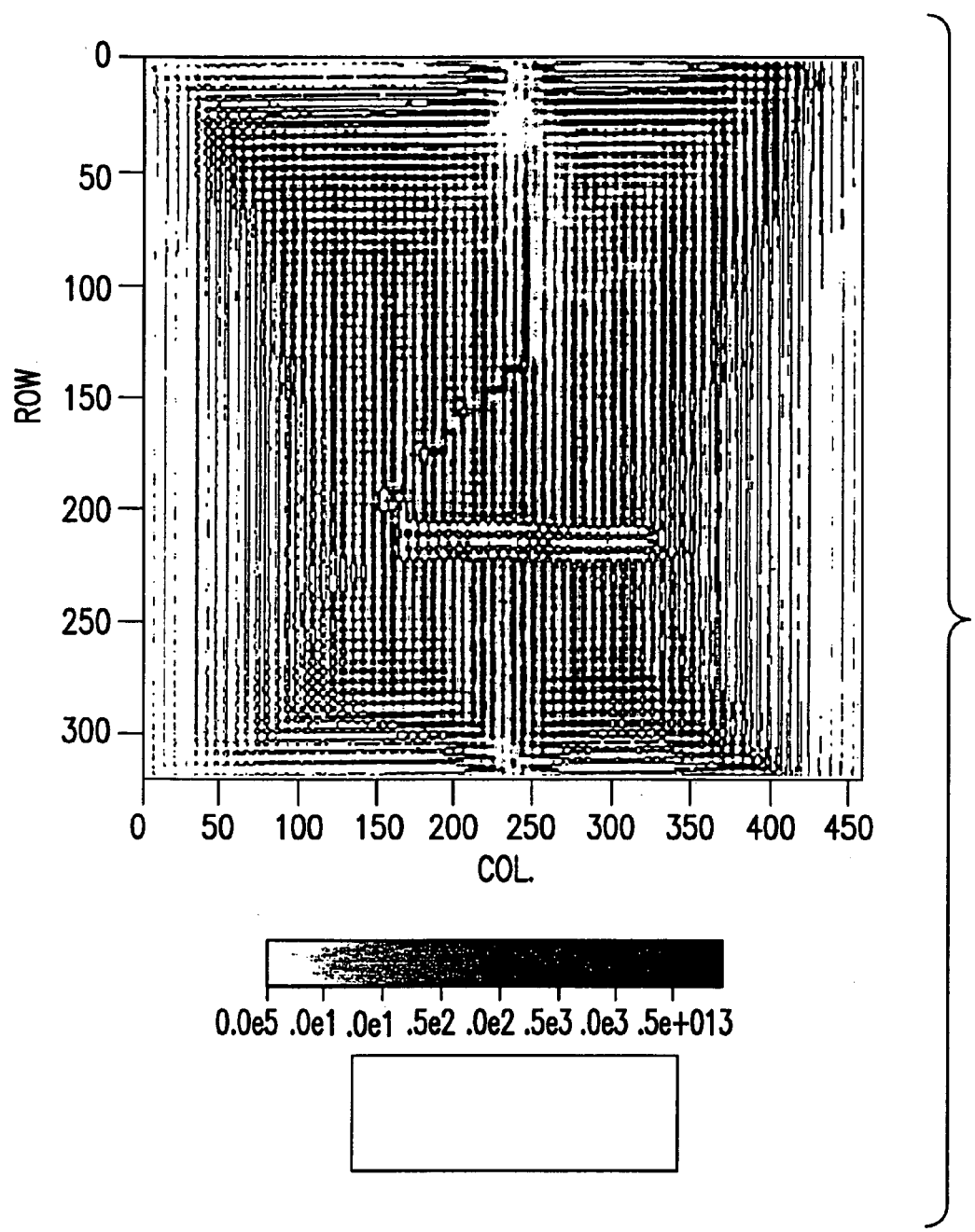
Figure 19C:
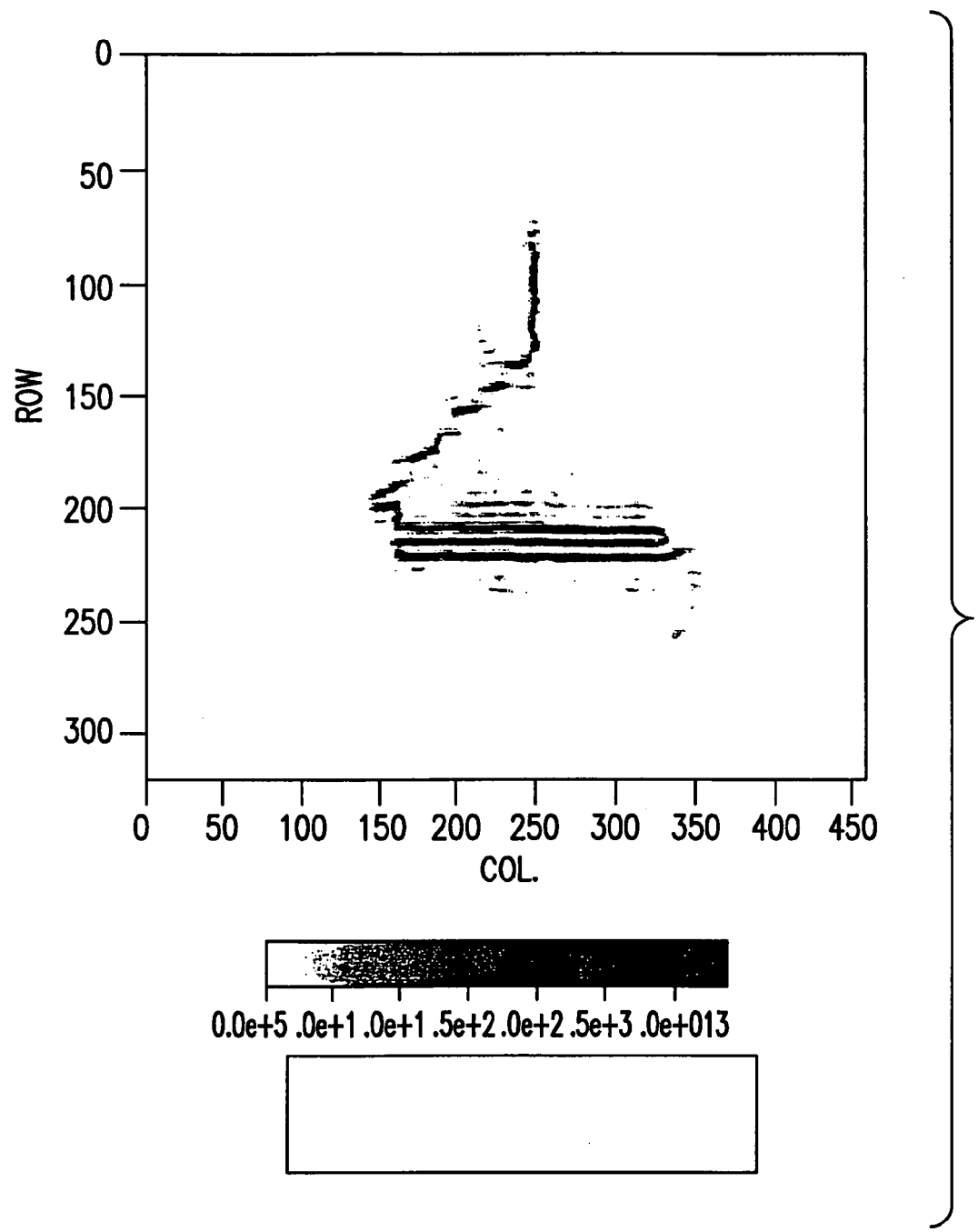

Two examples have been used to illustrate how $\pi$–$2\pi$ averaging can help with real magnetic field data inversions. The first example uses the magnetic field produced by wires within a multi-layer computer chip, as shown in FIG. 19A. Both the standard and $\pi$–$2\pi$ inversions use $2k_w z_0$=20. This value of $k_w$ is too high as the standard inversion, shown in FIG. 19B, produces a signal at the center of the picture, yet the image is still garbled by edge effects. The $\pi$–$2\pi$ inversion, shown in FIG. 19C, uses $2k_{ave}z_0$=10 and shows the currents in the center of the image with a great reduction in edge effects. For this image, it is important to be able to use a high $k_w$ so that the inversion has enough spatial resolution to permit resolving the three horizontal currents.

Figure 20A:
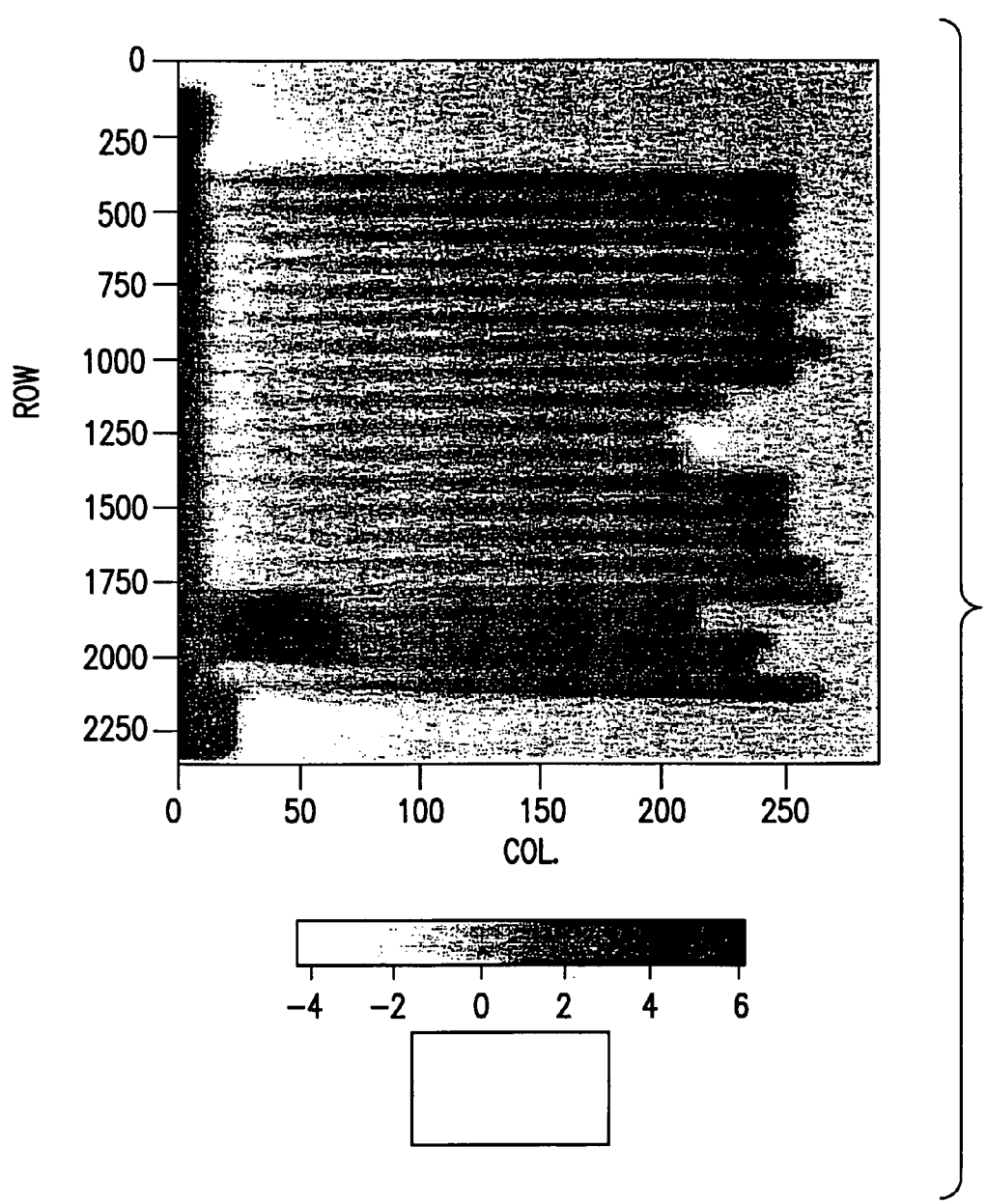
FIGS. 20A and 20B represent respectively magnetic field and current values of the wire of a zig-zag geometry.
Figure 20B:
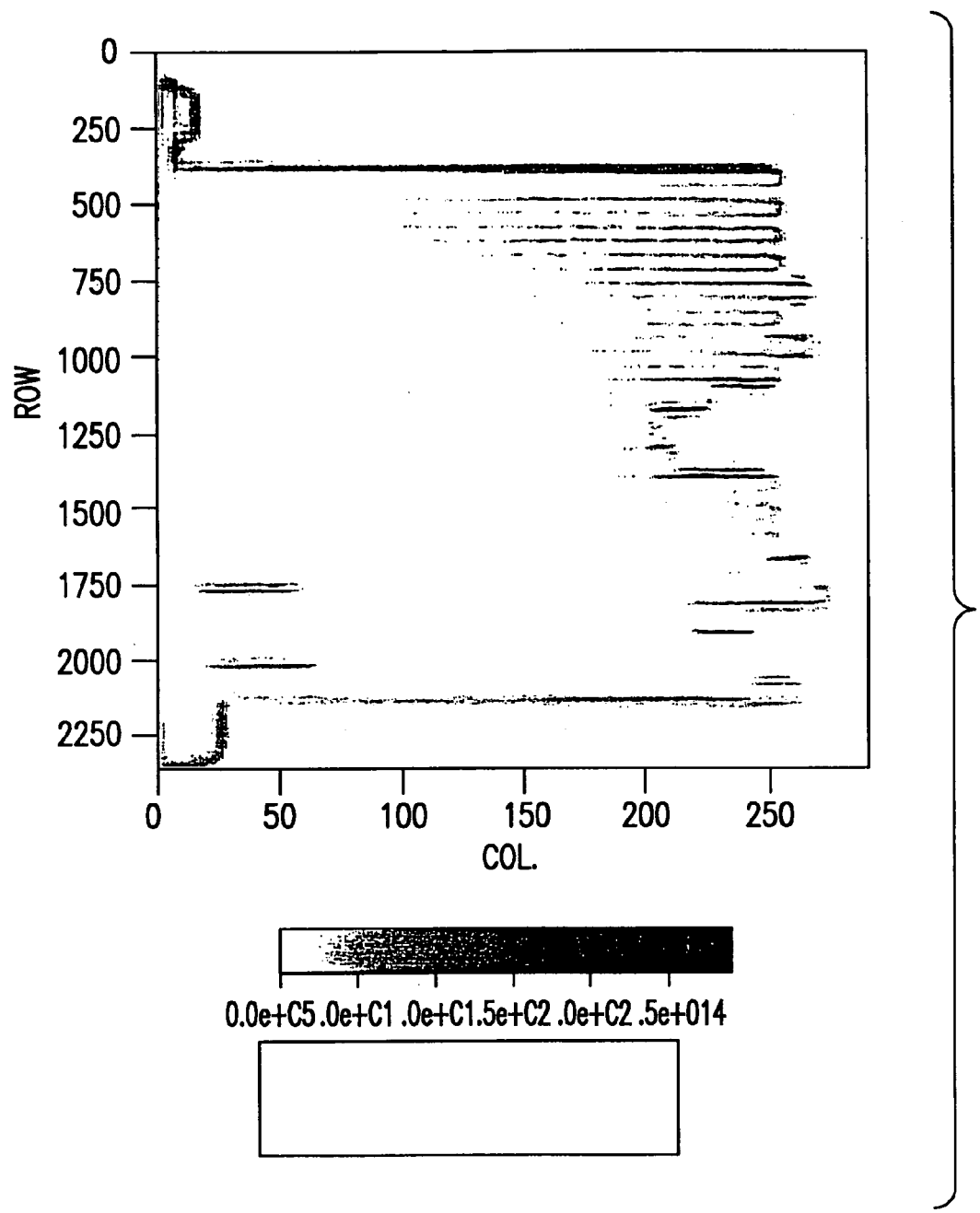

The second example, shown in FIG. 20A, uses the magnetic field produced by a zig-zag wire geometry. Referring again to FIG. 8, the analysis of the graphs presented therein suggests that $2k_{edge}z_0$ for this image are relatively small when compared to some of the previous examples, probably because despite the fact that on the right side of the image the current closest to the edge is about 0.5 mm away, at the left side of the image there is a great discontinuity in the currents. Both the standard and $\pi$–$2\pi$ inversions used $2k_w z_0$=15. At this value of $k_w$, the standard inversion is clearly dominated by edge effects. The $\pi$–$2\pi$ inversion, shown in FIG. 20B, on the other hand, uses $2k_{ave}z_0$=5 and has cleared up the edge effects to a great extent.

Thus, the spatial resolution of a magnetic field-to-current inversion is inversely proportional to the maximum frequency which is used in the inversion. High values of k-space cannot be used in the inversion since they are affected by the noise and the edges of the magnetic field image. The π–2π inversion process used as an enhancement to the standard inversion process permits smaller magnetic field images to be taken and still increases the range of k-space used by up to 50%. The novel π–2π technique for eliminating edge artifacts can be easily automated and incorporated into existing magnetic inversion software. It works effectively in many common applications of magnetic imaging.

The software of the system of the present invention uses some of the more complex Mathematica code in the calculations.

A) Displaying the two-dimensional array of data "mBx" in block 100 of FIG. 10 with an adequate grayscale and scaling of the axis.

```
mygray[g_] = GrayLevel [1-g];
mBxColorScaled = mBx / Max[mBx];
myTicks = Table [{t, .005 (5-Length[mBxColorScaled] / 2)},
    {t, 0, Length[mBxColorScaled], Length [mBxColorScaled] / 4}];
ListDensityPlot [mBxColorScaled, ColorFunction → mygray,
    ColorFunctionScaling → False, Mesh → False, FrameTicks → None,
    Axes → True, Ticks → {myTicks, myTicks},
    TextStyle → FontSize → 15];
```

B) Four panel shuffling process in block 102 of FIG. 10 for the two-dimensional array "mBk". This works for unshuffling in block 114 of FIG. 10 also. The variables hNx and hNy are half the number of points of the x and y directions respectively.

```
pA = Table[mBk[[y, Range[hNx+1, Nx]]], {y, hNy+1, Ny}];
pB = Table[mBk[[y, Range[hNx+1, Nx]]], {y, 1, hNy}];
pC = Table[mBk[[y, Range[1, hNx]]], {y, 1, hNy}];
pD = Table[mBk[[y, Range[1, hNx]]], {y, hNy+1, Ny}];
pAD = Table[Join[pA[[t]], pD[[t]]], {t, 1, hNy}];
pBC = Table [Join[pB[[t]], pC[[t]]], {t, 1, hNy}];
mBk = Join[pAD, pBC];
```

C) Hard cut off filtering in block 110 of FIG. 10 in k-space of two-dimensional array "mIk". The variables hNx and hNy are half the number of points in the x and y directions respectively; indexKcut is the index of k-space at which the cut off is to be performed. The initial calculation outputs $2k_w z_0$ for the given index of k-space.

$$dk * 2 * z_0 * indexKcut$$

$$mIkfilt = \text{Table}\left[\text{If}\left[\sqrt{(x-hNx)^2 + (y-hNy)^2} < indexKcut, mIk[[y, x]], 0\right],\right.$$
$$\left.\{y, 1, Ny\}, \{x, 1, Nx\}\right];$$

D) Averaging in block 106 of FIG. 10 in k-space of two-dimensional array "mBkP". The variables Nx and Ny are the number of points in the x and y directions respectively; indexAve is the index at which averaging begins. This code works by first averaging the left half, then the right half, of the data in the x-direction. It then averages the lower half, and then the upper half, of the data in the y-direction.

$$indexAve = 15;$$

$$x1 = \text{Table}\left[\text{If}\left[\sqrt{(x-Nx/2)^2 + (y-Ny/2)^2} > indexAve \,\&\&\, x \neq 1,\right.\right.$$
$$\left.\left.\frac{mBkP[[y, x-1]] + mBkP[[y, x]]}{2}, mBkP[[y, x]]\right],\right.$$
$$\left.\{y, 1, Ny\}, \{x, 1, Nx/2\}\right];$$

$$x2 = \text{Table}\left[\text{If}\left[\sqrt{(x-Nx/2)^2 + (y-Ny/2)^2} > indexAve \,\&\&\, x \neq Nx,\right.\right.$$
$$\left.\left.\frac{mBkP[[y, x+1]] + mBkP[[y, x]]}{2}, mBkP[[y, x]]\right],\right.$$
$$\left.\{y, 1, Ny\}, \{x, Nx/2+1, Nx\}\right];$$

$$mBkA = \text{Table}[\text{Join}[X1[[x]], x2[[x]]], \{x, 1, Ny\}];$$

$$dk * 2 * z_0 * indexAve$$

$$Y1 = \text{Table}\left[\text{If}\left[\sqrt{(x-Nx/2)^2 + (y-Ny/2)^2} > indexAve \,\&\&\, y \neq 1,\right.\right.$$
$$\left.\left.\frac{mbKa[[y-1, x]] + mBkA[[y, x]]}{2}, mBkA[[y, x]]\right],\right.$$
$$\left.\{y, 1, Ny/2\}, \{x, 1, Nx\}\right];$$

$$Y2 = \text{Table}\left[\text{If}\left[\sqrt{(x-Nx/2)^2 + (y-Ny/2)^2} > indexAve \,\&\&\, y \neq Ny,\right.\right.$$
$$\left.\left.\frac{mBkA[[y+1, x]] + mBkA[[y, x]]}{2}, mBkA[[y, x]]\right],\right.$$
$$\left.\{y, Ny/2+1, Ny\}, \{x, 1, Nx\}\right];$$

$$mBkA = \text{Join}[Y1, Y1].$$

Although this invention has been described in connection with specific forms and embodiments thereof, it will be appreciated that various modifications other than those discussed above may be resorted to without departing from the spirit or scope of the invention as defined in the appended Claims. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A method for suppressing edge effects in magnetic microscopy, comprising the steps of:
   providing a data processor;
   scanning a magnetic field sensor over an object under study having a magnetic field produced by currents running in said object under study;
   acquiring values of the magnetic field sensed by said sensor to create a first data set having N data points;
   adding N padding data points at an end of said first data set, each said padding data point having a zero value, thereby creating a second data set having 2N data points,
   applying a Fast Fourier Transform (FFT) to said second data set to obtain k-space having b(k) values, each b(k) value corresponding to a respective data point in said second data set;
   averaging said b(k) values of said k-space;
   filtering off the averaged b(k) values corresponding to a k-value exceeding a predetermined $k_w$ value;

obtaining a set of current density representations i(k) in the k-space, each said i(k) in the k-space being a representation of a respective density I(x,y) of currents flowing in said object under study; and applying an inverse FFT to said set of i(k) to obtain a map of said current densities I(x,y) of said object under the study.

2. The method of claim 1, wherein said sensor is a scanning Superconducting Quantum Interference Device (SQUID).

3. The method of claim 1, wherein the averaged b(k) is calculated as:

$$b(k_n) = \frac{b(k_n) + b(k_{n+1})}{2}$$

along each direction in the k-space, wherein $k_n$ and $k_{n+1}$ are neighboring points in the k-space.

4. The method of claim 3, wherein the averaged b(k) is calculated as:

$$b(k_n) = \frac{b(k_{n-1}) + 2b(k_n) + b(k_{n+1})}{4}$$

along each direction in the k-space, wherein $k_{n-1}$, $k_n$ and $k_{n+1}$ are neighboring points in the k-space in sequence.

5. The method of claim 1, further comprising the steps of:
defining an image size of an area of interest, and
measuring the magnetic field within boundaries of said image size.

6. The method of claim 5, further comprising the step of: increasing said $k_w$ by decreasing the image size.

7. The method of claim 5, further comprising the step of: increasing said $k_w$ by increasing the image size.

8. The method of claim 5, further comprising the step of: increasing said $k_w$ by increasing said N within the boundaries of said image size.

9. The method of claim 1, wherein said object includes a computer chip.

10. The method of claim 1, wherein said sensor is separated from the surface of said object under the study a predetermined distance.

11. The method of claim 10, wherein said separation is in the range of 100–200 μm.

12. The method of claim 5, wherein said image size is in the range 1 mm-10 cm.

13. The method of claim 1, wherein said first data set is a one-dimensional data set.

14. The method of claim 1, wherein said first data set is a two-dimensional data set.

15. The method of claim 14, further comprising the steps of:
dividing said two-dimensional first data set into four quadrants including first, second, third, and fourth quadrants;
shuffling said quadrants in a predetermined order by exchanging positions of said first and second quadrants, as well as said third and fourth quadrants, thus creating a shuffled two-dimensional data set;
applying the FFT to said shuffled two-dimensional data set of the b(k) values to obtain a two-dimensional k-space,
averaging said b(k) values of said two-dimensional k-space,
converting said b(k) values into representations of current densities i(k) in the k-space,
filtering said i(k),
applying the inverse FFT to said i(k) to obtain a shuffled two-dimensional set of current densities I(x,y), and
unshuffling said shuffled two-dimensional set of current densities to obtain said map of current densities I(x,y).

16. The method of claim 1, further comprising the step of:
dividing said averaged b(k) values by the Green's function g(k) to obtain said current density representations i(k).

17. A magnetic microscopy system for obtaining images with suppressed edge effects, comprising:
a SQUID microscope;
a positioning unit operatively coupled to said SQUID microscope for scanning the latter over an object under study;
a data processor coupled operatively to said SQUID microscope and said positioning unit, said data processor comprising:
(a) a data acquisition block coupled to said SQUID microscope and reading data output therefrom, said output data corresponding to magnetic fields generated by currents flowing in said object under study,
(b) a first data set block creating a first data set containing N data points acquired by said data acquisition block,
(c) edge artifacts suppressing block, comprising:
a padding block adding N zero data points to at least one end of said first data set, thus creating a second data set containing 2N data points,
a Fast Fourier Transformer (FFT) block applying Fast Fourier Transformer (FFT) to said second data set to create a set of b(k) values in a k-space, each b(k) value corresponding to a respective data point of said second data set,
an averaging block performing the averaging of said b(k) values of said k-space, and
a filter unit performing filtering said averaging b(k) values to cut off said averaged b(k) values corresponding to a k-value exceeding a predetermined $k_w$ value;
(d) a current densities calculation block obtaining a set of current densities representations i(k) in said filtered k-space, each said i(k) in the k-space representing a respective density I(x,y) of currents flowing in said object under the study; and
(e) an inverse FFT block applying inverse FFT to said set of current densities representations i(k) to obtain a map of currents densities I(x,y) flowing in said object under the study.

18. The system of claim 17, wherein said positioning unit includes a scanning platform, and motors controlled by said data processor for changing relative disposition between said SQUID microscope and said object in X, Y, and Z directions, said object under the study being mounted on said platform.

19. The system of claim 17 further comprising:
a shuffling unit performing the shuffling of said first data set to create a shuffled multi-dimensional data set; and
an unshuffling unit performing the unshuffling of a data set output from said inverse FFT block for applying inverse FFT.

* * * * *